United States Patent [19]

Maloomian

[11] Patent Number: 4,602,280

[45] Date of Patent: Jul. 22, 1986

[54] WEIGHT AND/OR MEASUREMENT REDUCTION PREVIEW SYSTEM

[76] Inventor: Laurence G. Maloomian, 764 Chestnut St., Needham, Mass. 02192

[21] Appl. No.: 557,750

[22] Filed: Dec. 5, 1983

[51] Int. Cl.⁴ .............................................. H04N 7/18
[52] U.S. Cl. ...................................... 358/93; 358/183; 358/903
[58] Field of Search .................. 358/93, 183, 107, 903

[56] References Cited

U.S. PATENT DOCUMENTS

| | | | |
|---|---|---|---|
| 4,232,334 | 11/1980 | Dyson | 358/93 |
| 4,261,012 | 4/1981 | Maloomian | 358/183 |
| 4,276,570 | 6/1981 | Burson | 358/93 |
| 4,297,724 | 10/1981 | Masuda | 358/93 |
| 4,467,349 | 8/1984 | Maloomian | 358/93 |
| 4,486,774 | 12/1984 | Maloomian | 358/93 |

FOREIGN PATENT DOCUMENTS

1020276 11/1977 Canada .................................. 358/93

Primary Examiner—Howard W. Britton
Attorney, Agent, or Firm—Thompson, Birch, Gauthier & Samuels

[57] ABSTRACT

A weight and/or measurement reduction preview wherein a first image of a person is recorded. The person's desired proportions are entered into the computer and the recorded image is reproportioned based on the desired proportions, and the original image and the recreated image are displayed side-by-side.

15 Claims, 3 Drawing Figures

WEIGHT AND/OR MEASUREMENT REDUCTION PREVIEW SYSTEM

BACKGROUND AND BRIEF SUMMARY OF THE INVENTION

The invention disclosed herein is a modification in design and application of my invention as disclosed in Ser. Nos. 366,372 now U.S. Pat. No. 4,467,349, and 466,973 now U.S. Pat. No. 4,486,774, which are improvements of my prior invention, U.S. Pat. No. 4,261,012, dated Apr. 7, 1981. The prior art discussed in that patent pending is still considered to be the most relevant prior art together with Dyson, U.S. Pat. No. 4,232,134.

This invention relates to a system of the type enabling a subject using the system to view a picture showing the subject as she (or he) will appear if her body is physically reproportioned. For instance, such a system when used in a weight loss clinic will allow a customer to sample the effect that a certain amount of weight loss will have on her appearance prior to losing that amount of weight. The system when used in a figure salon will allow a customer to sample the effect that the reduction of, and/or the toning of certain areas of the body such as the bust, waist, hips, thighs, etc. would have on her appearance prior to the reduction or and/or the toning of those certain areas. In either instance the system will have the ability to produce an instant "before and after" picture of the customer (i.e., before the weight loss, after the weight loss) so that the customer can better evaluate the effect a prescribed exercise and/or diet program will have on her appearance before commiting herself to that program.

My invention is broadly directed to a system for displaying to a customer a view of that customer as though the customer had actually lost a certain amount of weight and/or reduced and/or toned certain areas of her body; which system comprises means to record and display a full figure image of the customer; means to vary the dimensions of the image; and means to display the reproportioned image. In the preferred embodiment, the system comprises a video camera, a frame grabber, a CPU, an image buffer, a memory, and a video screen. The video camera takes the image of the customer which is digitized by the frame grabber, stored in memory and ultimately displayed on the video screen. Through use of the CPU, the stored image is varied along the horizontal and/or vertical axes to provide a re-proportioned image of the customer. Preferably, this is accomplished by stretching and/or shrinking rasters horizontally and/or vertically along the full height of the image, based on a calculated stretch and/or shrink factor. For example, I can scale the image which is stored in memory to reflect any bust, waist, hip, thigh, etc. measurement, and/or body weight that the customer hopes to attain by following the exercise and/or diet program offered by the figure salon or weight loss clinic.

DESCRIPTION OF THE PREFERRED EMBODIMENTS

Figures 1, 2A, 2B:
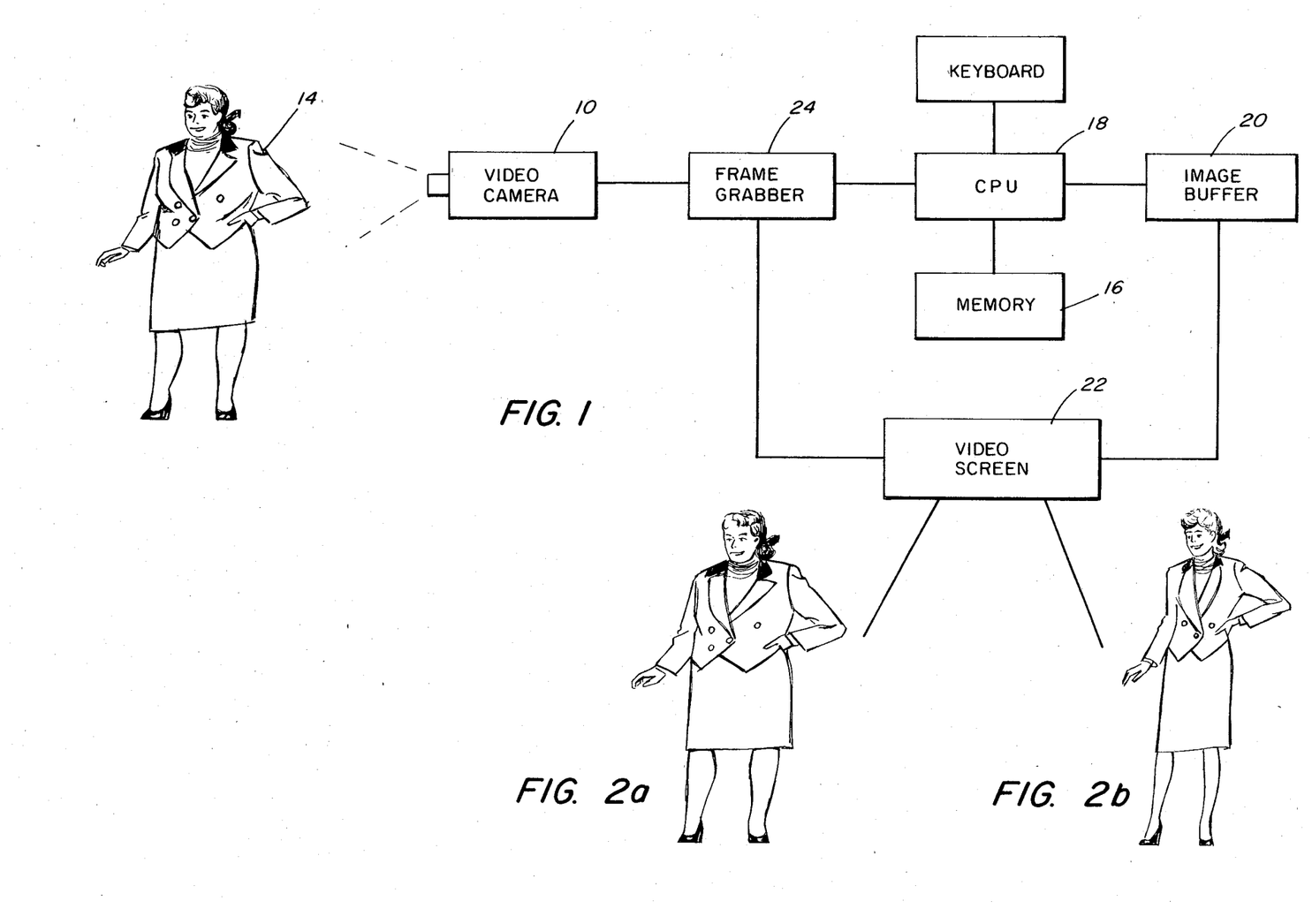
FIG. 1 is a block diagram representing the preferred embodiment of my invention.
FIG. 2a is a schematic representing the first or "before" image.
FIG. 2b is a schematic representing the second or "after" image.

Referring to FIG. 1, a video camera 10 such as A JVC model KY1900CH communicates with a frame grabber 12 such as a Datacube 150. The camera 10 records the customer 14 to provide the first or "before" image, see FIG. 2a. The image is stored in a memory 16 such as a DSD 880 via a CPU 18 such as a DEC LSI 11/23. The image from the memory 16 is input to an image buffer 20 such as a Datacube 150. The image in the image buffer 20 is scaled and the output is displayed on the video screen 22 such as a Conrac 5711 as the second or "after" image, see FIG. 2b.

The control of the CPU 18 is accomplished through instructions. The instructions are written in terms of the particular mode of operation desired. The computer thus has stored in its memory the programs or routines corresponding to each mode or operation of the computer. It is well known to those skilled in the art, that the computer comprises suitable controls, storage and computational units for performing the various arithmatic and logical functions on data which it processes in digital form. Any standard computer can be used for the instructions. The routines are not described in detail, since they can be written in any desired notations, formats or sequences, depending upon the particular program being utilized, computer language, etc. For the specific computer of the preferred embodiment, the manufacturer's handbooks sets forth the necessary program which includes the sequence of internal interconnections which have been added by the preparation and loading of the program into the internal memory of the computer.

Referring to FIG. 1, in the operation of the invention, after all components are actuated, the customer 14 is viewed by the video camera 10. The video signals from the video camera 10 are digitized by the frame grabber 24 and displayed on the video screen 22 as the first or "before" image, see FIG. 2a. The image in the frame grabber is composed of horizontal lines of information called "rasters". The image which may be in black and white, or color is stored in memory 16 raster by raster. The customers present statistics such as height, weight, bust, waist, hip, etc. measurements are fed to the CPU 18. The customers height and desired statistics such as weight, bust, waist, hip, etc. measurements are fed to the CPU 18. The CPU 18 calculates a horizontal and/or vertical stretch and/or shrink factor to be applied to the stored image so that the stored image is reproportioned from the present statistics to the desired statistics. The horizontal and/or vertical stretch and/or shrink factor is applied to the stored image on a raster by raster basis and the stretched or squeezed result is displayed on the video screen 22 as the second or "after" image, see FIG. 2b. More particularly, starting at a specified raster of the image each raster is stretched and/or shrunk horizontally and/or vertically by the stretch and/or shrink factor and a new raster calculated.

Two alternatives may be used in this step. First, a simple repartitioning of the raster using fractions of pixels according to the stretch and/or shrink factor; or secondly, a low pass filtering and sampling according to the pixel spacing, preferably, two dimensional filtering (incorporating the rasters above and below the current raster) should contribute less distortion to the stretched and/or shrunk image. Each new computer raster is loaded into the display device on top of the customer image and the next rasters are computed in sequence until the re-proportioned image is complete as shown in FIG. 2b. Alternately, the first image can be input in digitized form into the image buffer and not initially displayed. The second image is overlayed electronically onto the first image and the re-proportioned image is scanned out and displayed. A separate buffer may be used to store the first image and the images from both buffers displayed alternately or simultaneously.

The following is an illustration of a specific use of my invention.

Step 1. A customer is positioned in front of the video camera 10.

Step 2. The video output from the camera 12 is routed to a frame grabber 24. The frame grabber converts the image into digital form, and sends the digital data representing the image to the image buffer 20 which is capable of holding and displaying two full images.

Step 3. The operator of the system is then prompted via a menu display for the following information: the sex, the height, the current weight and/or measurements, and the desired weight and/or measurements of the customer. These dimensions are entered into the CPU 18 via the keyboard for computation of the necessary stretch and shrink factors, used to stretch and shrink the customer's originally captured image to the desired form.

Step 4. From the entered dimensions (i.e. for women: bust, waist, hips, etc. measurements), the necessary stretch and shrink factors are computed, one factor for every horizontal raster line of video information in the image.

Step 5. The customer's original image is then stretched and squeezed via a software program, horizontal line by horizontal line, from the head area downwardly as dictated by the computed stretch and squeeze factors. Two alternatives may be used in this step:

(1) A simple repartioning of the raster using fractions of pixels according to the stretch and/or shrink factor, or (2) A low-pass filtering and sampling according to the new pixel spacing, preferably two dimensional filtering (incorporating the rasters above and below the current raster) contributes less unwanted distortion to the stretched and/or shrunk image.

As each horizontal raster line undergoes transformation by the software program, a new and corresponding raster line of digital video information is created. This new raster is stored in the second half of the image buffer at a location corresponding to the location of the original raster line, in the first half of the image buffer, from which it was computed. This process is repeated for all raster lines from the head downwardly. Those raster lines near transitions in the image from regions of reproportionment to regions that will remain identical to the original image are handled in one of two different ways:

(1) The newly computed data is mixed back with data from the original image at the corresponding location so that a smooth blending and transition takes place in the newly computed image from the original form to the new form.

(2) The blending is performed on the stretch and/or shrink factors so smooth transitions of stretch and/or shrink occur from regions of change to regions of no change.

Step 6. The new image, now fully computed and stored in the undisplayed half of the image buffer, is now displayed. The effect is that the customer has taken on the new dimensions entered to the machine in step 3. The operator of the device may now elect to instantly switch between the customer's original image and the newly computed and shaped image, both of which are now stored in the image buffer, and in so doing give the customer, in an instant, a preview of the "before" and "after" picture of herself at the new dimensions.

The software set forth below is an example of the specific steps used in the system and process of my invention.

```
Computer Figure Weight/Measurement Reduction Preview 0000000 007 001 306   0 326 006 344      \0  \0  \0  \0  \0  \0 001  \0
0000020  \t 360 200 035 002  \0   0  \n 376 377 200 021 306 345 004  \0
0000040 216 035 004  \0 320 013   6 020 002  \0 320 013 376 002   >
0000060 002  \0 001 207 340 013   6 020 004  \0   7 020 242   W 367  \t
0000100  \n  \0 226   % 016 020 337  \t   h   ' 001 211   W  \t   1   0
0000120 306 345 030  \0 365   % 001  \0 004  \0 002 004   7  \n 304   0
0000140 003  \n 300 020 300  \f 301 020   W   p 340 001 301   e 264   A
0000160   p 020 230   N 203  \n 303   % 003  \0 363 006 300 025   T   G
0000200   7 020   ,   N   5 020 346 377   7 020   "   N 300 035         N
0000220 300   e   @ 001   7 020 032   N   5 020 344 377 300 035 022   N
0000240 300   e   @ 001   7 020  \f   N   5 020 342 377 003  \n  \0  \n
0000260   = 220 342 377   = 220 344 377   = 220 346 377 265  \n 346 377
0000300 265  \n 344 377 265  \n 342 377 203  \n 303   %   @ 001 357 006
0000320 016  \n 346 025 016  \0 337  \t   8 021 326 013 003 020 013 004
0000340 316 025   .   1 346 025   J   6 337  \t 262 036 326 013 316 025
0000360 377 377 337  \t   h   ' 016  \n 346 025   N   1 337  \t 376   .
0000400 326 013   7 020 274   @ 016 020 337  \t  \0 021 316 025   W   1
0000420   &  \n 337  \t 272  \r 326 013 016  \n 346 025  \f  \0 337  \t
0000440   8 021 326 013 016  \n 346 025  \r  \0 337  \t   8 021 326 013
0000460 003  \n 203  \n 303   %       N 374 006 316 025 344 001 346 025
0000500 013  \0 337  \t   8 021 326 013 016  \n 346 025  \r  \0 337  \t
0000520   8 021 326 013 003  \n 203  \n 303   %       N 374 006 016  \n
0000540 346 025 013  \0 337  \t   8 021 326 013 367 013 266   / 002 003
```

| | | | | | | | | | | | | | | |
|---|---|---|---|---|---|---|---|---|---|---|---|---|---|---|
| 0000560 | 367 | \t | T | 004 | 316 | 025 | 260 | N | f | 021 | 316 | e | 362 | 377 | f | 021 |
| 0000600 | 316 | e | 364 | 377 | f | 021 | 316 | e | 366 | 377 | 337 | \t | 302 | \b | 306 | e |
| 0000620 | 006 | \0 | 316 | 025 | e | 1 | 346 | 025 | \b | \0 | 337 | \t | 272 | \r | 326 | 013 |
| 0000640 | 316 | 025 | f | 1 | 346 | 025 | 007 | \0 | 337 | \t | 272 | \r | 326 | 013 | 367 | 245 |
| 0000660 | m | \0 | \f | M | 005 | 002 | 5 | 376 | 364 | 377 | u | 376 | 362 | 377 | \f | 001 |
| 0000700 | @ | 035 | 364 | 377 | 027 | t | 002 | \0 | 0 | 377 | 270 | 0 | A | 035 | 362 | 377 |
| 0000720 | w | t | 002 | \0 | q | 377 | 270 | 0 | 001 | 371 | 7 | 374 | 316 | 5 | 027 | 362 |
| 0000740 | 200 | E | 7 | 373 | 312 | : | 367 | 025 | P | \0 | 314 | ? | 300 | 035 | 310 | ? |
| 0000760 | 300 | e | 240 | \0 | 7 | 020 | 302 | ? | 367 | 025 | 240 | \0 | 276 | ? | 7 | 377 |
| 0001000 | 252 | 5 | 027 | 371 | 200 | A | 5 | 374 | 350 | 377 | 027 | 365 | | D | 027 | 371 |
| 0001020 | \0 | A | % | 001 | \0 | \n | * | 001 | 5 | 377 | 354 | 377 | u | 377 | 350 | 377 |
| 0001040 | 001 | 364 | 004 | 373 | 300 | 035 | 224 | ? | 300 | \f | 0 | 021 | 240 | 7 | 5 | 377 |
| 0001060 | 354 | 377 | u | 377 | 350 | 377 | 001 | 364 | D | 376 | 001 | 366 | 027 | 362 | \0 | F |
| 0001100 | 027 | 364 | \0 | @ | 301 | 035 | t | ? | 301 | \f | 367 | \n | n | ? | 1 | 373 |
| 0001120 | | : | 7 | 377 | U | 5 | & | 370 | 5 | 377 | 354 | 377 | 026 | 366 | 5 | 374 |
| 0001140 | 354 | 377 | \0 | 377 | \0 | 360 | 326 | 005 | 300 | 025 | 001 | \0 | 367 | 013 | L | ? |
| 0001160 | 323 | 004 | 367 | 013 | F | ? | 024 | 004 | 267 | \n | @ | ? | 367 | 025 | 241 | \0 |
| 0001200 | < | ? | 027 | 365 | | D | 027 | 371 | \0 | A | w | 377 | 036 | 5 | 001 | 364 |
| 0001220 | 5 | 374 | 354 | 377 | 027 | 367 | | D | \0 | 360 | 022 | 006 | \0 | \n | 022 | 001 |
| 0001240 | 304 | 035 | 030 | ? | 304 | 013 | 352 | 005 | \0 | 021 | 300 | \f | 360 | 025 | 377 | 377 |
| 0001260 | 240 | 7 | \0 | 021 | 300 | \f | 360 | 025 | 377 | 377 | | : | 304 | \n | 362 | 001 |
| 0001300 | 300 | 025 | 001 | \0 | 367 | % | @ | 001 | 364 | > | * | 007 | 5 | 377 | 354 | 377 |
| 0001320 | u | 377 | 350 | 377 | 001 | 364 | 004 | 373 | 300 | 035 | 342 | > | 300 | \f | 0 | 021 |
| 0001340 | 240 | 7 | 5 | 377 | 354 | 377 | u | 377 | 350 | 377 | 001 | 364 | D | 376 | 001 | 366 |
| 0001360 | 027 | 362 | \0 | F | 027 | 364 | \0 | @ | 301 | 035 | 302 | > | 301 | \f | 267 | \n |
| 0001400 | 274 | > | 1 | 373 | | : | 7 | 377 | 242 | 4 | & | 370 | 5 | 377 | 354 | 377 |
| 0001420 | 026 | 364 | 276 | 001 | 367 | % | @ | 001 | 244 | > | 002 | 002 | 367 | \n | 236 | > |
| 0001440 | 303 | 035 | 230 | > | 031 | 001 | 004 | \n | 300 | 020 | 300 | \f | \0 | a | 300 | \f |
| 0001460 | 001 | 021 | w | p | z | 9 | 302 | 020 | 302 | \f | 201 | 1 | | : | W | t |
| 0001500 | 365 | 377 | 302 | 020 | 302 | \f | 201 | 1 | 240 | 7 | p | 020 | 250 | < | 204 | \n |
| 0001520 | 304 | % | 002 | \0 | 351 | 006 | 203 | \n | 303 | - | b | > | 344 | 006 | 303 | 035 |
| 0001540 | Z | > | \r | 001 | 300 | 020 | 027 | t | 002 | \0 | 360 | 013 | 250 | < | \n | 004 |
| 0001560 | 300 | 020 | 027 | t | 002 | \0 | 360 | 013 | 252 | < | 004 | 004 | 203 | \n | 303 | - |
| 0001600 | < | > | 360 | 006 | 367 | 020 | 4 | > | 303 | 035 | 2 | > | 303 | \n | 303 | - |
| 0001620 | * | > | t | 005 | 367 | 020 | & | > | 367 | 013 | 210 | - | 027 | 003 | 367 | \t |
| 0001640 | 316 | 004 | 316 | 035 | 030 | > | 346 | 035 | 022 | > | 346 | 035 | \f | > | 346 | 035 |
| 0001660 | 006 | > | 337 | \t | 212 | 006 | 306 | e | 006 | \0 | 316 | 025 | 036 | \0 | 346 | 025 |
| 0001700 | F | \0 | 346 | 025 | < | \0 | 337 | \t | Z | 007 | 226 | % | 316 | 025 | y | 1 |
| 0001720 | 346 | 025 | 001 | \0 | 337 | \t | 272 | \r | 326 | 013 | 316 | 025 | z | 1 | 346 | 025 |
| 0001740 | \t | \0 | 337 | \t | 272 | \r | 326 | 013 | 016 | \n | & | \n | 337 | \t | 370 | 017 |
| 0001760 | 326 | 013 | 316 | 035 | 314 | = | 337 | \t | ~ | 020 | 367 | \t | 242 | \0 | 316 | 025 |
| 0002000 | 344 | 001 | 346 | 025 | 013 | \0 | 337 | \t | 8 | 021 | 326 | 013 | 367 | \t | " | 001 |
| 0002020 | 300 | 013 | 002 | 003 | _ | \0 | 1 | \0 | 316 | 035 | 246 | = | 337 | \t | 274 | 020 |
| 0002040 | 016 | \n | 346 | 025 | 013 | \0 | 337 | \t | 8 | 021 | 326 | 013 | 016 | \n | 346 | 025 |
| 0002060 | \r | \0 | 337 | \t | 8 | 021 | 326 | 013 | 003 | \n | 203 | \n | 303 | % | | N |
| 0002100 | 374 | 006 | 316 | 025 | 344 | 001 | 346 | 025 | 013 | \0 | 337 | \t | 8 | 021 | 326 | 013 |
| 0002120 | 016 | \n | 346 | 025 | \r | \0 | 337 | \t | 8 | 021 | 326 | 013 | 367 | \t | 026 | \f |
| 0002140 | 316 | 025 | f | 1 | 346 | 025 | 007 | \0 | 337 | \t | 272 | \r | 326 | 013 | 016 | \n |
| 0002160 | & | \n | 337 | \t | 370 | 017 | 326 | 013 | w | \0 | L | , | 300 | 020 | 027 | t |
| 0002200 | 002 | \0 | 360 | % | 240 | \0 | 250 | < | 205 | 006 | 300 | 020 | 027 | t | 002 | \0 |
| 0002220 | 360 | % | 240 | \0 | 252 | < | 002 | 007 | _ | \0 | 204 | 003 | _ | \0 | ! | 003 |
| 0002240 | w | \t | 030 | , | 300 | 025 | 377 | 377 | 7 | 020 | \n | 8 | 7 | 020 | 004 | 8 |
| 0002260 | 7 | 020 | 376 | 7 | 016 | \n | 346 | 025 | 004 | \0 | 337 | \t | 8 | 021 | 326 | 013 |
| 0002300 | 304 | 025 | < | \0 | 016 | 021 | 337 | \t | N | 013 | 304 | % | F | \0 | 013 | 005 |
| 0002320 | 316 | 025 | 036 | \0 | 346 | 025 | F | \0 | 346 | 025 | < | \0 | & | 021 | 337 | \t |
| 0002340 | x | \f | 306 | e | 006 | \0 | 016 | \n | 346 | 025 | 004 | \0 | 337 | \t | 8 | 021 |
| 0002360 | 326 | 013 | 316 | 035 | 276 | I | 316 | m | 302 | < | 346 | 035 | 264 | I | 316 | m |
| 0002400 | 272 | < | 346 | 035 | 252 | I | 316 | m | 262 | < | 346 | 035 | 260 | < | 316 | 355 |
| 0002420 | 252 | < | 346 | 035 | 246 | < | & | 021 | 316 | e | 344 | 001 | 337 | \t | ° | 024 |
| 0002440 | 306 | e | \n | \0 | 204 | \n | 304 | % | 344 | 001 | 314 | 006 | \0 | \n | w | \0 |
| 0002460 | 226 | + | w | \t | 206 | + | 306 | 345 | \f | \0 | 365 | 025 | 344 | 001 | 356 | 377 |
| 0002500 | 316 | 025 | 206 | 1 | 346 | 025 | 001 | \0 | 337 | \t | 272 | \r | 326 | 013 | 316 | 025 |
| 0002520 | 207 | 1 | 346 | 025 | 002 | \0 | 337 | \t | 272 | \r | 326 | 013 | 316 | 025 | 001 | \0 |
| 0002540 | f | 021 | 316 | e | 360 | 377 | 346 | 035 | X | < | 337 | \t | J | / | 226 | % |

```
0002560  @  235  360  377  300  345    a  \0  027       005  \0  003  202  300   \f
0002600  x  \0   "    1  316  025  267    1  346  025  002  \0  337  \t  272   \r
0002620 326  013  316  025  003  \0  337  \t   v    '  316  025  316    1  346  025
0002640  \b  \0  331  001  \0  \n   w  \0  036    +  300  025  001  \0  373  001
0002660 300  025  344  001    @  355  356  377    5  020  356  377  016  020  346  025
0002700 013  \0  337  \t    8  021  311  001   w  \t  360    *  346  013  316  025
0002720 320    1  346  025  001  \0  337  \t  272  \r  326  013  316  025  321    1
0002740 346  025  002  \0  337  \t  272  \r  326  013  316  025  374    1  346  025
0002760 002  \0  337  \t  272  \r  326  013  316  025       2  346  025  002  \0
0003000 337  \t  272  \r  326  013  016  \n  346  025  001  \0  337  \t    8  021
0003020 326  013  316  025   "    2  346  025  002  \0  337  \t  272  \r  326  013
0003040 367  \n   (    0  007  005  300  237       0  300    E  \0  377  267  \n
0003060 030    0  004  001  316  025   :    6  337  \t  256  037    5  020  370  377
0003100 300   %  \n  \0  355  002  016  \n  346  025  002  \0  337  \t    8  021
0003120 326  013  316  025   O    2  346  025  002  \0  337  \t  272  \r  326  013
0003140 316  025  005  \0  337  \t   \  006   w  \0   \    *   w  \t   L    *
0003160 306  345  004  \0    5  \n  370  377  \n  001    5  \n  366  377  265  \n
0003200 366  377  365    %  020    '  366  377  372  006  265  \n  370  377   u    -
0003220 004  \0  370  377  362  006   w  \0    .    *   w  \t  036    *  016  \n
0003240  &  \n   &  \n   &  \n  346  025   @  001   &  \n   &  \n  337  \t
0003260  f  026  306   e  \f  \0  016  \n   &  \n   &  \n  346  025  344  001
0003300  f  035  004  \0  316  \n   &  \n   &  \n  337  \t   f  026  306   e
0003320 \f  \0  016  \n   &  \n   &  \n  346  025  344  001  346  025   @  001
0003340  &  \n   f  035  006  \0  337  \t   f  026  306   e  \f  \0  016  \n
0003360  &  \n   &  \n  346  025  344  001  346  025   @  001  346  025  344  001
0003400  &  \n  337  \t   f  026  306   e  \f  \0  016  \n   &  \n   &  \n
0003420 346  025  310  003   f  035  \b  \0  316  \n  346  025  344  001   &  \n
0003440 337  \t   f  026  306   e  \f  \0  016  \n   &  \n   &  \n  346  025
0003460 310  003   f  035  \n  \0  316  \n  346  025   R  002   f  035  \b  \0
0003500 337  \t   f  026  306   e  \f  \0  016  \n   &  \n   &  \n  346  025
0003520 310  003  346  025   @  001  346  025  344  001   f  035  \n  \0  337  \t
0003540  f  026  306   e  \f  \0   w  \0    '    )   w  \t    N    )  306  345
0003560 006  \0  304  025  020  300  303  025  \0  300  302  025       300  016  \n
0003600 346  025  003  \0  337  \t    8  021  326  013   u  035  004  \0  370  377
0003620  i  001  316  025  240  \0    A  035  \b  \0  300  \r  027    r  002  \0
0003640 016  340  346  025  017  \0  337  \t    8  021  326  013  300  013  002  005
0003660 \0  \n  002  001  300  025  001  \0    5  020  366  377  \n  003  016  020
0003700 346  025   z    2  337  \t  342  036  326  013  316  025  377  377  337  \t
0003720  h    '    N  035  370  377  346  025  020  \0  337  \t    8  021  326  013
0003740   5  020  366  377  \n  004  016  020  346  025  224    2  337  \t  342  036
0003760 326  013  316  025  377  377  337  \t   h    '    A  035  370  377   A  355
0004000 004  \0   u   p  \b  \0   W   p  003  \0  301   e  024    K   u  020
0004020 364  377    5  \n  366  377  006  001   =  223  364  377  265  \n  364  377
0004040 265  \n  366  377   u    -  \b  \0  366  377  366  006    5  \n  366  377
0004060 006  001  375  222  364  377  265  \n  364  377  265  \n  366  377   u    -
0004100 \b  \0  366  377  366  006    5  \n  366  377  006  001  275  222  364  377
0004120 265  \n  364  377  265  \n  366  377   u    -  \b  \0  366  377  366  006
0004140 265  \n  370  377   u    -  006  \0  370  377  223  006   w  \0   X    (
0004160  w  \t   H    (  004  \n  304    %   n  \0  024  007  316  035    4    F
0004200 346  035    .    F  346  035    (    F   &  021  337  \t    0  025  306   e
0004220 006  \0  003  020  \r  004  316  020  346  025  256    2  337  \t  342  036
0004240 326  013  300  020   w  \0       (  316  020  346  025  315    2  366  001
0004260 316  035  \0    F  346  035  372    E  346  035  364    E   &  021  316   e
0004300 344  001  337  \t  340  023  306   e  006  \0  003  020  355  005  204  \n
0004320 322  001   w  \t  346    '  306  345  006  \0  316  025  354    2  346  025
0004340 001  \0  337  \t  272  \r  326  013  316  025  355    2  346  025  003  \0
0004360 337  \t  272  \r  326  013  316  025  356    2  346  025  001  \0  337  \t
0004400 272  \r  326  013  316  025  357    2  346  025  002  \0  337  \t  272  \r
0004420 326  013    N  035  \n  \0  346  025  023    3  337  \t  324  027  326  013
0004440 367  \n    (    -  007  005  300  237       -  300    E  \0  377  267  \n
0004460 030    -  004  001  316  025   :    6  337  \t  256  037    5  020  364  377
0004500 316  025  003  \0  337  \t       013  375  245   m  \0  \n  \0  004  003
0004520 375  245   f  \0  \n  \0  317  002    N  035  \n  \0  346  025  004  \0
0004540 337  \t  272  \r  326  013  316  025  027    3  346  025  001  \0  337  \t
```

```
0004560 272  \r  326  013  375  245   m   \0  \n   \0   "  002  316  025  030   3
0004600 346  025  001  \0  337  \t  272  \r  326  013  316  025  031   3  346  025
0004620 002  \0  337  \t  272  \r  326  013   N  035  006  \0  346  025   6   3
0004640 337  \t  324  027  326  013  316  025  003  \0  337  \t       013  375   %
0004660  $   \0  006  \0  343  006  375   %   .   \0  006  \0  337  005   $  001
0004700 375  245   f   \0  \n   \0       002  316  025   9   3  346  025  001  \0
0004720 337  \t  272  \r  326  013  316  025   :   3  346  025  002  \0  337  \t
0004740 272  \r  326  013   N  035  006  \0  346  025   V   3  337  \t  324  027
0004760 326  013  316  025  003  \0  337  \t       013  375   #  006  \0  344  006
0005000 375   %  020  \0  006  \0  340  005  367  \n   @   ,  007  005  300  237
0005020  8   ,  300   E  \0  377  267  \n   0   ,  004  001  316  025   :   6
0005040 337  \t  256  037   5  020  364  377   N  037  006  \0  346  025   Y   3
0005060 346  025  242   O  337  \t  016  037  226   %  316  025  242   O  346  025
0005100 005  \0  337  \t  272  \r  326  013  316  025   \   3  346  025  001  \0
0005120 337  \t  272  \r  326  013  375  245   m   \0  \n   \0   "  002  316  025
0005140  ]   3  346  025  001  \0  337  \t  272  \r  326  013  316  025   `   3
0005160 346  025  002  \0  337  \t  272  \r  326  013   N  035  \b  \0  346  025
0005200 177   3  337  \t  324  027  326  013  316  025  003  \0  337  \t       013
0005220 375   %   $  \0  \b  \0  343  006  375   %   .   \0  \b  \0  337  005
0005240  %  001  375  245   f   \0  \n   \0   !  002  316  025  202   3  346  025
0005260 001  \0  337  \t  272  \r  326  013  316  025  203   3  346  025  002  \0
0005300 337  \t  272  \r  326  013   N  035  \b  \0  346  025  249   3  337  \t
0005320 324  027  326  013  316  025  003  \0  337  \t       013  375   %  006  \0
0005340 \b   \0  343  006  375   %  020  \0  \b   \0  337  005  367  \n   \   +
0005360 007  005  300  237   T   +  300   E  \0  377  267  \n   L   +  004  001
0005400 316  025   :   6  337  \t  256  037   5  020  364  377   N  037  \b  \0
0005420 346  025  246   3  346  025  242   O  337  \t  016  037  226   %  316  025
0005440 242   O  346  025  006  \0  337  \t  272  \r  326  013   w  \0  230   %
0005460  w   \t  210   %  306  345  004  \0   5  \n  370  377  \n  001   5  \n
0005500 366  377  265  \n  366  377  365   %  020   '  366  377  372  006  265  \n
0005520 370  377   u   -  004  \0  370  377  362  006   w  \0   j   %   w  \t
0005540  Z   %  306  345       \0  365  035   >   C  370  377   @  035  370  377
0005560 300   e  240  \0   5  020  366  377  300   e  240  \0   5  020  364  377
0005600 016  \n  346  025  003  \0  337  \t   8  021  326  013   N  035  364  377
0005620  f  035  366  377   f  035  370  377  346  035  036   6  316  355  030   6
0005640 346  035  024   6   f  035  004  \0  337  \t  312  024  306   e  \n  \0
0005660 300  013  013  003   N  035  360  377   N   m  354  377  346  025  252   3
0005700 346  025   J   6  337  \t  262  036  226   %  300  035  342   B  300   m
0005720 352   5   5  020  370  377  300  035  330   B  300   m  336   5   5  020
0005740 366  377  300  035  316   B  300   m  322   5   5  020  364  377  300  035
0005760 312   5  027   t  002  \0  300   e  250   <   5  020  332  377  365  035
0006000 272   5  354  377   ;  001   B  035  332  377  365   e  004  \0  332  377
0006020 303  035  224   B  203   b  300  222   5  020  340  377  303   e  240  \0
0006040 300  222   5  020  336  377  300  234  240  \0   5  020  334  377  200  024
0006060 303  035   t   B  203   b  300  222   5   `  340  377  303   e  240  \0
0006100 300  222   5   `  336  377  300  234  240  \0   5   `  334  377   @  035
0006120 340  377  200  \f   =  220  370  377  265  \n  370  377   @  035  336  377
0006140 200  \f   =  220  366  377  265  \n  366  377   @  035  334  377  200  \f
0006160  =  220  364  377  265  \n  364  377  265  \n  354  377  365   -   >   5
0006200 354  377  301  004   w  \0   @   $   w  \t   0   $  306  345  022  \0
0006220  A  035  \n  \0  300  \r  027   r  002  \0   &  020  300  035  020   B
0006240 300   e  240  \0  200  345  004  020  003  021  303   e   @  001  300  020
0006260 300   e   @  001   5  020  362  377   A  035  004  \0   A  355  006  \0
0006300  u   p  \n  \0   W   p  003  \0  301   e  024   K   u  020  370  377
0006320  @  020   @   m  \n  \0   5  020  366  377   @   m  \n  \0   5  020
0006340 364  377   @  035  004  \0   @  355  006  \0  \0  376   A  035  \b  \0
0006360  A  355  006  \0   A  376  001  371   5  374  352  377  027  365  200   @
0006400  u  377  352  377  001  366   5  374  356  377   5  \n  350  377   W  001
0006420  @  237  370  377  \0  376  265  \n  370  377   u  377  356  377  001  362
0006440  &  370  \0  223  \0  376   u  377  352  377  001  362  026  364  027  364
0006460 \0   @  002  373  302   %   ?  \0  002  004  302  025   ?  \0  302  013
0006500 001  004  002  \n  224  220   @  237  366  377  \0  376  265  \n  366  377
0006520  u  377  356  377  001  362   &  370  300  222  \0  376   u  377  352  377
0006540 001  362  026  364  027  364  \0   @  002  373  302   %   ?  \0  002  004
```

```
0006560  302 025   ?  \0 302 013 001 004 002 \n 229 220   @ 237 364 377
0006600  \0 376 265 \n 364 377   u 377 356 377 001 362   & 370   @ 237
0006620 362 377  \0 376   u 377 352 377 001 362 026 364 027 364  \0   @
0006640 002 373 302   %   ?  \0 002 004 302 025   ?  \0 302 013 001 004
0006660 002  \n 275 220 362 377 265  \n 362 377 265  \n 350 377   u   -
0006700  \n  \0 350 377 245 006   w  \0 376   "   w  \t 356   " 346 013
0006720   @ 035 004  \0 027     013  \0   % 202 300  \f   x  \0 264   3
0006740 367  \t 222 002 316 025 024  \0 337  \t 312 017   N 035 006  \0
0006760 337  \t 234   . 001 020 300  \r 027   r 002  \0   & 020 300 025
0007000   '  \0 200 345   5 020 370 377 316 025 005  \0   f 035 370 377
0007020 337  \t 370 017 326 013   N 035 006  \0 346 025 314   3 337  \t
0007040 342 036 326 013  \0  \n   w  \0 236   " 365 025 016  \0 370 377
0007060   N 035 370 377   &  \n 337  \t 370 017 326 013 367  \t 036 002
0007100 265  \n 370 377 365   % 022  \0 370 377 362 004 367 025 016  \0
0007120 220   I 350 001 367   % 022  \0 210   I 344 005 316 035 202   I
0007140 346 025 022  \0 337  \t 370 017 326 013   N 035 006  \0 346 025
0007160 317   3 337  \t 342 036 326 013 267  \n   f   I 323 001 316 025
0007200 027  \0   &  \n 337  \t 370 017 326 013 367  \t 320 001 316 025
0007220 027  \0 346 025 031  \0 337  \t 370 017 326 013 316 025 322   3
0007240 337  \t 342 036 277 001 316 025 027  \0 346 025 036  \0 337  \t
0007260 370 017 326 013   N 035 006  \0 346 025 360   3 260 001 316 025
0007300 027  \0 346 025   (  \0 337  \t 370 017 326 013   N 035 006  \0
0007320 346 025 363   3 244 001 316 025 027  \0 346 025   7  \0 337  \t
0007340 370 017 326 013   N 035 006  \0 346 025 366   3 337  \t 342 036
0007360 326 013 316 025 027  \0   &  \n 337  \t 370 017 222 001 316 025
0007400 013  \0   &  \n 337  \t 370 017 326 013 367  \t   P 001   N 035
0007420 006  \0 337  \t 234   . 001 020 300  \r 027   r 002  \0   & 020
0007440 300 025   '  \0 200 345   5 020 370 377 316 025 013  \0   f 035
0007460 370 377 337  \t 370 017 326 013   N 035 006  \0 346 025 371   3
0007500   _  \0 016 016 316 025  \t  \0   &  \n 337  \t 370 017 326 013
0007520 367  \t  \n 001   N 035 006  \0 337  \t 234   . 001 020 300  \r
0007540 027   r 002  \0   & 020 300 025   '  \0 200 345   5 020 370 377
0007560 316 025  \t  \0   f 035 370 377 337  \t 370 017 326 013   N 035
0007600 006  \0 346 025 374   3   _  \0 016 016 367   % 016  \0   R   H
0007620 002 002   _  \0 024 016 367  \n   H   H 316 035   D   H   &  \n
0007640 337  \t 370 017 326 013 367  \t 264  \0   _  \0 024 016 316 025
0007660 027  \0 365 001 316 025 027  \0 346 025 022  \0 337  \t 370 017
0007700 326 013   N 035 006  \0 346 025 377   3 337  \t 342 036 326 013
0007720 316 025 027  \0 346 025 022  \0 217 001   w  \t 336     306 345
0007740 004  \0   5  \n 370 377  \n 001   5  \n 366 377 265  \n 366 377
0007760 365   % 020   ' 366 377 372 006 265  \n 370 377   u   - 004  \0
0010000 370 377 362 006   w  \0 300       w  \t 260     365 013 004  \0
0010020 004 005 365   %   O  \0 004  \0 003 004 300 025 001  \0 035 001
0010040 365 013 006  \0 372 005 365   % 027  \0 006  \0 366 005   @ 035
0010060 004  \0 300   e      \0  \0 220 016 020   @ 035 006  \0 300   e
0010100  \0  \0 220   & 020 300 235 310   * &  020 346 025 004   4
0010120 337  \t 342 036 306   e 006  \0  \0  \n  \0   j     w  \t
0010140   Z     300 235 254   * 016 020 346 025  \f   4 337  \t 342 036
0010160 326 013   w  \0   R     w  \t   B     300 235 224   * 016 020
0010200 346 025 020   4 337  \t 342 036 326 013   w  \0   :     w  \t
0010220   *     316 025 324   W 346 025  \b   t   f 035 004  \0 337  \t
0010240 330   . 226   % 367 035  .@   G   @   G 367   U 002  \0   8   G
0010260 367   E  \b  \0   2   G 316 025 324   W 346 025  \t   t   f 035
0010300 004  \0 337  \t 330   . 226   %   w  \0 374 037   w  \t 354 037
0010320 367 035 026   G 022   G 316 025 324   W 346 025  \t   t   f 035
0010340 004  \0 337  \t 330   . 226   %   w  \0 334 037   w  \t 314 037
0010360 306 345 006  \0   N 021 316   e 364 377 346 025 036   t   f 035
0010400 004  \0 337  \t 330   . 226   %   @ 235 364 377   w  \0 270 037
0010420   w  \t 250 037 316 025 324   W 346 025  \b   t   f 035 004  \0
0010440 337  \t 330   . 226   % 367   E 002  \0 274   F 367   U  \b  \0
0010460 266   F 316 025 324   W 346 025  \t   t   f 035 004  \0 337  \t
0010500 330   . 226   %   w  \0 200 037   w  \t   p 037 306 345 004  \0
0010520 304 025 022 300 303 025 002 300 302 025   " 300   5  \n 370 377
0010540   @ 035 004  \0 300 345 001  \0 027     022  \0 002 203   _  \0
```

```
0010560 312 023 300  \f   x  \0   >   4 316 025 360 377 346 025 001  \0
0010600 346 025 006  \0 337  \t   &   / 226   % 300 013 021 004 316 025
0010620   d   4 346 025   J   6 337  \t 262 036 326 013 300 025 377 377
0010640   w  \0   $ 037   7 023   D   F 367 022   B   F 267 022   @   F
0010660  \0  \n 366 001 314 035   4   F 313 035   2   F 312 035   0   F
0010700 367 001 314 025 020  \0 313 025 020  \0 312 025 020  \0   ?  \n
0010720   p   "   ?  \n   n   "   ?  \n   l   "   ?  \n   j   "   ?  \n
0010740   h   "   ?  \n   f   " 344 001 314   E 007  \0 314   U  \f  \0
0010760 313   E 007  \0 313   U  \f  \0 312       007  \0 312   U  \f  \0
0011000 327 001  \0  \n   ? 020       "   ? 020 032       "   ? 020 024   "
0011020 314   E 007  \0 314   U 005  \0 314   E 007  \0 313   E 007  \0
0011040 313   U 005  \0 313   E 007  \0 312   E 007  \0 312   U 005  \0
0011060 312   E 007  \0 275 001 314   E 007  \0 313   E 007  \0 370 001
0011100 314   E 007  \0 314   U 001  \0 313   E 007  \0 313   U 001  \0
0011120 312   E 007  \0 312   U 001  \0 253 001 314   E 007  \0 314   U
0011140 002  \0 313   E 007  \0 313   U 002  \0 312   E 007  \0 312   U
0011160 002  \0 236 001 377   E   0  \0 312   ! 377   E   0  \0 310   !
0011200 377   E   0  \0 306   ! 224 001 377   E   0  \0 266   ! 377   U
0011220 020  \0 260   ! 377   E   0  \0 256   ! 377   U 020  \0 250   !
0011240 377   E   0  \0 246   ! 377   U 020  \0 240   ! 201 001 377   E
0011260   0  \0 220   ! 377   U      \0 212   ! 377   E   0  \0 210   !
0011300 377   U      \0 202   ! 377   E   0  \0 200   ! 377   U      \0
0011320   z   !   _  \0 240 021 377   U   0  \0   h   ! 377   U   0  \0
0011340   f   ! 377   U   0  \0   d   !   _  \0 240 021 314   E 020  \0
0011360 313   E 020  \0 312   E 020  \0   _  \0 240 021 314   U 020  \0
0011400 313   U 020  \0 312   U 020  \0   _  \0 240 021 177 035 006  \0
0011420   0   !   A 035 006  \0  \0  \n 027   v 370 377 177 020   $   !
0011440 177 035 006  \0       !   A 035 006  \0  \0  \n 027   v 370 377
0011460 177 020 024   ! 177 035 006  \0 020   !   A 035 006  \0  \0  \n
0011500 027   v 370 377 177 020 004   !   _  \0 240 021 365   %   @ 001
0011520 006  \0 035 203 365 013 006  \0   A 035 006  \0  \0  \n 027   v
0011540 370 377   u 020 366 377 177 035 006  \0 276     177 035 366 377
0011560 272     177 035 006  \0 266     177 035 366 377 262     177 035
0011600 006  \0 256     177 035 366 377 252       _  \0 240 021 365 025
0011620 377 377 370 377   _  \0 240 021 365   %  \0 004 006  \0 367 203
0011640 365 013 006  \0   A 035 006  \0  \0  \n 027   v 370 377   u 020
0011660 366 377 177 035 006  \0   ~     177 035 366 377   z     177 035
0011700 006  \0   v     177 035 366 377   r     177 035 006  \0   n
0011720 177 035 366 377   j       _  \0 240 021   N 035 004  \0 346 025
0011740 213   4 346 025   J   6 337  \t 262 036 226   %   _  \0 214 021
0011760   w  \t 310 034   D 035 006  \0   C 035  \b  \0   B 035  \n  \0
0012000 346 013 016  \n 346 025 017  \0 337  \t   8 021 326 013 300 013
0012020  \n 004 300 025 377 377 005 001 300 025 376 377 002 001 300 025
0012040 375 377   w  \0 242 034   N 035 004  \0 346 025 020  \0 337  \t
0012060   8 021 326 013 300 013 360 005 016  \n 346 025 004  \0 337  \t
0012100   8 021 326 013 300 013 353 005   5  \n 370 377  \0 225   ? 020
0012120   f     300 224   ? 020   b     200 224   ? 020   *     265  \n
0012140 370 377 365   %   @ 001 370 377 361 006  \0  \n 332 001   w  \t
0012160   J 034   D 035  \n  \0   C 035  \f  \0   B 035 016  \0 346 013
0012200   N 035 006  \0 346 025 017  \0 337  \t   8 021 326 013 300 013
0012220 007 004 300 025 377 377 002 001 300 025 376 377   w  \0   ( 034
0012240   N 035 004  \0 346 025 020  \0 337  \t   8 021 326 013 300 013
0012260 363 005   5  \n 370 377 013 001  \0 225   ? 020 372 037 300 224
0012300   ? 020 366 037 200 224   ? 020 362 037 265  \n 370 377   u   -
0012320  \b  \0 370 377 361 006  \0  \n 341 001   w  \t 336 033   D 035
0012340  \n  \0   C 035  \f  \0   B 035 016  \0 346 013   N 035 006  \0
0012360 346 025 017  \0 337  \t   8 021 326 013 300 013 007 004 300 025
0012400 377 377 002 001 300 025 376 377   w  \0 274 033   N 035 004  \0
0012420 346 025 020  \0 337  \t   8 021 326 013 300 013 363 005   5  \n
0012440 370 377  \b 001 324 237 220 037 323 237 216 037 322 237 214 037
0012460 265  \n 370 377   u   -  \b  \0 370 377 364 006  \0  \n 344 001
0012500   w  \t   x 033   D 035 006  \0   C 035  \b  \0   B 035  \n  \0
0012520 346 013 016  \n 346 025 017  \0 337  \t   8 021 326 013 300 013
0012540 007 004 300 025 377 377 002 001 300 025 376 377   w  \0   X 033
```

```
0012560   N  035  004   \0  346  025  020   \0  337   \t    8  021  326  013  300  013
0012600 363  005  016   \n  346  025  003   \0  337   \t    8  021  326  013    5   \n
0012620 370  377  324  237    "  037  323  237       037  322  237  036  037  265   \n
0012640 370  377  365    %    @  001  370  377  364  006   \0   \n  337  001    w   \t
0012660  \n  033    D  035  006   \0    C  035   \b   \0  346  013  302  025  316    0
0012700 316  025   \0  004  246  020    f  035  004   \0  337   \t    J    /  226    %
0012720   5  020  370  377  300    %   \0  004   \f  007  016  020  346  025  256    4
0012740 346  025    J    6  337   \t  262  036  226    %  300  025  377  377    w   \0
0012760 326  032    5   \n  370  377  224  224  223  224  275  224   \n   \0  265   \n
0013000  \n   \0  265   \n  370  377  365    %    @  001  370  377  364  006   \0   \n
0013020 356  001    w   \t  246  032    D  035  006   \0    C  035   \b   \0  346  013
0013040 302  025  316    0  316  025   \0  002  246  020    f  035  004   \0  337   \t
0013060   J    /  226    %    5  020  370  377  300    %   \0  002   \f  007  016  020
0013100 346  025  316    4  346  025    J    6  337   \t  262  036  226    %  300  025
0013120 377  377    w   \0    r  032    5   \n  370  377  224  224  223  224  275  224
0013140  \n   \0  265   \n   \n   \0  265   \n  370  377  365    %  240   \0  370  377
0013160 364  006   \0   \n  356  001    w   \t    B  032    D  035   \f   \0    C  035
0013200 016   \0    B  035  020   \0  306  345  004   \0    u    -   \b   \0  004   \0
0013220  \t  004    u  035  004   \0  370  377    u  035   \b   \0  004   \0    u  035
0013240 370  377   \b   \0    u    -   \n   \0  006   \0   \t  004    u  035  006   \0
0013260 370  377    u  035   \n   \0  006   \0    u  035  370  377   \n   \0  016   \n
0013300 346  025  021   \0  337   \t    8  021  326  013  300  013  013  004  316  025
0013320 366    4  346  025    J    6  337   \t  262  036  326  013  300  025  377  377
0013340   _   \0  320  027  016   \n  346  025  004   \0  337   \t    8  021  326  013
0013360 300  013   \n  004  316  025  033    5  346  025    J    6  337   \t  262  036
0013400 326  013  300  025  376  377    1  001    u  035  006   \0  370  377    `  001
0013420   N  035  004   \0  346  025  017   \0  337   \t    8  021  326  013    N  035
0013440 370  377  346  025  020   \0  337   \t    8  021  326  013    u  035  004   \0
0013460 366  377    3  001    ?  021  310  035  377  020  306  035  277  020  304  035
0013500   ?  021  274  035  377  020  272  035  277  020  270  035    ?  021  260  035
0013520 377  020  256  035  277  020  254  035    ?  021  244  035  377  020  242  035
0013540 277  020  240  035    ?  021  230  035  377  020  226  035  277  020  224  035
0013560   ?  021  214  035  377  020  212  035  277  020  210  035    ?  021  200  035
0013600 377  020    ~  035  277  020    !  035    ?  021    t  035  377  020    r  035
0013620 277  020    p  035  365    e   \b   \0  366  377    @  035   \b   \0  300    e
0013640 371  377    @    -  366  377  306  005    u  035  366  377  366  377   \b  001
0013660   ?  021    L  035  377  020    J  035  277  020    H  035  265   \n  366  377
0013700   u    -   \b   \0  366  377  364  004  265   \n  370  377    u    -   \n   \0
0013720 370  377  236  004  016   \n  346  025  022   \0  337   \t    8  021  326  013
0013740   w   \0  344  030    w   \t  324  030    N  021  316    e  006   \0    f  035
0013760 004   \0  346  025    :    6  337   \t    P  030  226    %    w   \0  310  030
0014000   w   \t  270  030    N  021  316    e   \b   \0    f  035  006   \0    f  035
0014020 004   \0  337   \t    P  030  226    %    w   \0  254  030    w   \t  234  030
0014040   D  035  004   \0  306  345   \b   \0  365  225    A   \0  370  377   \0  021
0014060   5  020  366  377    5  020  362  377    5   \n  364  377  002  001  265   \n
0014100 364  377  324  213  374  002    N  021  316    e   \b   \0    f  035  006   \0
0014120   f  021  316    e  362  377  337   \t    P  030  226    %    w   \0    h  030
0014140   w   \t    X  030    D  035  006   \0    C  035   \b   \0  306  345   \f   \0
0014160   5   \n  370  377    5   \n  360  377    _   \0  252  031    @  037  004   \0
0014200 275   \n  004   \0   \0  222  300    E   \0  377    _   \0  342  031  002  225
0014220 302    %    %   \0  002  002    _   \0  314  031    5   \n  362  377  302    %
0014240   *   \0  005  003  365  020  362  377  303    e  002   \0  001  001  002  225
0014260   5   \n  366  377  365  025  001   \0  356  377   \n  001    A  035  366  377
0014300   W    p   \n   \0  201    `  301    e  320  377    u  020  366  377  002  225
0014320 362  265  004   \0  355    6  362  002  365  013  366  377  003  002  365  025
0014340   0    u  366  377  302    %    1   \0  005  002  002  225  365  025  002   \0
0014360 356  377  016  001  302    %    h   \0  004  002    5   \n  356  377  002  225
0014400 007  001  302    %    [   \0  004  002  016  021  337   \t    T  036  004  020
0014420 362  265  001   \0  355    6  005  003  302    e   \0  365  025  002   \0
0014440 356  377  302  013  003  002  300  025  377  377  037  001    N  021  316    e
0014460 360  377    f  035  004   \0    f  035  356  377    f  035  366  377  246  020
0014500   f  035  362  377  337   \t   \0  032  306    e   \n   \0  300  013  005  003
0014520 365  013  362  377  002  003  265   \n  370  377  365  013  360  377    -  003
0014540 365  013  370  377  340  003    @  035  370  377    w   \0    Z  027    @  035
```

```
0014560  004    \0   360   \n   002   \0   \b   005   @    037  004   \0   275   \n   004   \0
0014600  \0     222  300   E    \0    377  004  001   N    035  004   \0   337   \t   256   037
0014620  5      020  364   377  300   %          \0    352  003  300   %     \t   \0    347   003
0014640  300    %    \n    \0   344   003  300  %     377  377  007  003   N     035  004   \0
0014660  f      035  364   377  337   \t   d    037   326  013  002  225   200   020  323   003
0014700  027         \t    \0   324   003  027        \n   \0   321  003   027                \0
0014720  316    003  027        %     \0   002  002        \0   ~    030   @     035  004   \0
0014740  360    \n   002   \0   002   005  _    \0    1    030  N    035   004   \0   337   \t
0014760  256    037  5     020  364   377  200       340   003  300  %     377   377  223   003
0015000  N      035  004   \0   f     035  364  377   337  \t   d    037   326   013  253   001
0015020  w      \t   250   026  306   345  N    \0    365  %    c    \0    006   \0   \b    003
0015040  365    %    s     \0   006   \0   004  003   365  %    [    \0    006   \0   025   002
0015060  N      035  016   \0   f     035  \f   \0    f    035  \b   \0    f     035  006   \0
0015100  365    013  004   \0   003   003  f    037   004  \0   001  001   &     \n   337   \t
0015120  R      035  306   e    \b    \0   w    \0    n    026  5    \n    254   377  5     \n
0015140  256    377  5     \n   260   377  5    \n    266  377  365  %     e     \0   006   \0
0015160  004    003  365   %    f     \0   006  \0    003  002  365  025   001   \0   266   377
0015200  302    025  \n    \0   365   %    o    \0    006  \0   003  002   302   025  \b    \0
0015220  006    001  365   %    x     \0   006  \0    002  002  302  025   020   \0   D     021
0015240  304    e    272   377  5     \n   270  377   5    \n   264  377   @     035  \f    \0
0015260  360    \n   002   \0   \b    005  @    037   \f   \0   275  \n    \f    \0   \0    222
0015300  300    E    \0    377  004   001  N    035   \f   \0   337  \t    256   037  003   020
0015320  303    %         \0    353   003  303  %     \t   \0   350  003   303   %    \n    \0
0015340  345    003  303   %    -     \0   5    002   265  \n   264  377   324   220  @     035
0015360  \f     \0   360   \n   002   \0   \b   005   @    037  \f   \0    275   \n   \f    \0
0015400  \0     222  300   E    \0    377  004  001   N    035  \f   \0    337   \t   256   037
0015420  003    020  365   \n   \b    \0   1    001   365  013  264  377   013   003  A     035
0015440  256    377  @     035  254   377  \0   013   001  013  200  013   5     020  254   377
0015460  u      020  256   377  303   %    377  377   002  002  _    \0    330   034  N     035
0015500  \f     \0   346   020  337   \t   d    037   326  013  =    \n    016   \0   _     \0
0015520  336    034  303   %    +     \0   021  002   365  \n   \b   \0    @     035  \f    \0
0015540  360    \n   002   \0   002   004  _    \0    314  034  @    037   \f    \0   275   \n
0015560  \f     \0   \0    222  300   E    \0    377   003  020  365  \n    \b    \0   314   005
0015600  363    265  004   \0   355   6    8    002   302  %    020  \0    )     003  303   %
0015620  .      \0   002   002  _     \0   x    034   303  %    e    \0    003   003  303   %
0015640  E      \0   272   002  365   013  270  377   267  002  302  %     \n    \0   264   002
0015660  365    013  266   377  261   003  365  013   260  377  256  003   265   \n   270   377
0015700  324    220  @     035  \f    \0   360  \n    002  \0   002  004   _     \0   222   034
0015720  @      037  \f    \0   275   \n   \f   \0    \0   222  300  E     \0    377  e     001
0015740  303    %    a     \0   003   006  303  %     f    \0   006  004   303   %    A     \0
0015760  316    006  303   %    F     \0   313  005   265  \n   260  377   302   %    \b    \0
0016000  007    002  A     035  256   377  @    035   254  377  027  v     003   \0   027   001
0016020  302    %    \n    \0   016   002  A    035   256  377  @    035   254   377  027   v
0016040  002    \0   @     m    254   377  A    m     256  377  @    013   027   v    001   \0
0016060  006    001  A     035  256   377  @    035   254  377  027  v     004   \0   5     020
0016100  254    377  u     020  256   377  365  020   262  377  303  %     0     \0   006   006
0016120  303    %    9     \0   003   005  303  345   0    \0   013  001   303   %    a     \0
0016140  006    006  303   %    f     \0   003  005   303  345  W    \0    002   001  303   345
0016160  7      \0   301   020  300   \r   5    `     254  377  u    `     256   377  u     013
0016200  254    377  C     035  262   377  "    001   302  %    \n   \0    002   003  _     \0
0016220  \b     033  365   013  266   377  002  002   _    \0   \b   033   265   \n   260   377
0016240  025    001  N     035  \f    \0   337  \t    256  037  003  020   303   %    +     \0
0016260  \r     003  303   %    -     \0   \n   003   303  %    0    \0    002   007  _     \0
0016300  \b     033  303   %    9     \0   002  004   _    \0   \b   033   324   220  @     035
0016320  \f     \0   360   \n   002   \0   002  005   _    \0   Z    033   N     035  \f    \0
0016340  337    \t   256   037  _     \0   h    033   375  025  001  \0    016   \0   365   013
0016360  004    \0   005   003  @     021  300  e     272  377  \0   !     003   002  \0    \n
0016400  _      \0   F     032  024   212  @    035   266  377  027  t     004   \0   @     ]
0016420  \n     \0   027        022   \0   013  202   300  \f   x    \0    302   5    N     021
0016440  316    e    272   377  337   \t   (    A     037  004  \0   \t    374   300  025
0016460  001    \0   _     \0   F     032  N    021   316  e    272  377   337   \t   (
0016500  A      037  004   \0   \t    370  363  001   @    037  004  \0    H     035  256   377
0016520  356    001  @     037  004   \0   p    035   256  377  002  \0    H     035  254   377
0016540  346    001  w     \t   V     023  D    035   004  \0   C    035   \n    \0   306   345
```

```
0016560  004   \0    =   \n   \f   \0    5  021  370  377  365    %    c   \0  006   \0
0016600  007  002  365    %    0    u   \b   \0  003  002  365  025  001   \0   \b   \0
0016620    5   \n  366  377  365    %    s   \0  006   \0  003  002  365  025  001   \0
0016640  366  377  363   \n  002   \0  006  005  300  236   \0   \0  300    E   \0  377
0016660  213   \n  003  001  316  020  337   \t  256  037  002  020    r  275  366  377
0016700    B    5  003  003  302    %  377  377  354  002  365  025  001   \0  366  377
0016720  365    %    c   \0  006   \0  003  002    5   \n  366  377  037  001  365    %
0016740    [   \0  006   \0  033  002  365  025  002   \0  366  377  027  001    r  275
0016760  366  377    B    5  026  002  304  019  001  003  224  220  365   \n   \b   \0
0017000  020  007  363   \n  002   \0  006  005  300  236   \0   \0  300    E   \0  377
0017020  213   \n  003  001  316  020  337   \t  256  037  002  020  302    %  377  377
0017040  346  002  302    %  377  377  013  003  365  013   \b   \0  005  007  316  020
0017060  246  020  337   \t    d  037  326  019    =   \n   \f   \0  003  001  375  025
0017100  001   \0   \f   \0  304  013   \f  003    D    -  370  377   \t  003  365    %
0017120    c   \0  006   \0  001  003  024  212  300  025  001   \0    w   \0    h  022
0017140   \0   \n  374  001    w   \t    T  022    D  035  004   \0  002   \n  314  245
0017160    '   \0  002  002  202   \n  204   \n  003   \n  302  013  004  003  363  305
0017200  002   \0    B    5  003  001  363  325  002   \0    B    5  203   \n  303    %
0017220  200   \0  363  006  003  225  300  020  300    E  200  377  300    %    ]   \0
0017240   \r  003  302  013  004  003  363  325  002   \0    B    5  003  001  363  305
0017260  002   \0    B    5  203   \n  303  013  355  002  304   \n   \0  021    w   \0
0017300  006  022    w   \t  366  021    N  035  004   \0    f  021  316    e   \b   \0
0017320    f  035  006   \0  337   \t    1    !  226    %    @  035  004   \0  360  265
0017340        \0  006   \0  004  003  300  025  377  377    w   \0  332  021   \0   \n
0017360  374  001    w   \t  306  021  316  025    B    6    f  021  316    e  006   \0
0017400    f  035  004   \0  337   \t    1    !  226    %  367  265        \0    H  027
0017420  004  003  300  025  377  377    w   \0  256  021   \0   \n  374  001    w   \t
0017440  232  021  306  345   \b   \0  365  225    B   \0  370  377    u  035  004   \0
0017460  362  377  365  025  377  177  364  377    N  021  316    e  362  377    f  021
0017500  316    e   \b   \0    f  035  006   \0  337   \t    1    !  226    %  365   \n
0017520  364  377  005  005    =  212  362  377  265   \n  362  377  007  001    N  021
0017540  316    e  362  377    &   \n  337   \t  264    %  326  013    @  035  004   \0
0017560    w   \0    T  021    w   \t    D  021    D  035  006   \0  365    %  377  377
0017600  004   \0  022  002  300  025  377  377   \r  001  364  013  002   \0  372  002
0017620   \0  237   \0   \0  214   \n  264   \n  002   \0  314   \n    !  235  004   \0
0017640   \0   \0   \0   \n    w   \0       021  364  265  001   \0  006   \0  003  003
0017660   \f    -  004   \0  360  207   \f    -  004   \0  347  003  343  001    w   \t
0017700  372  020    D  035  004   \0  364  265  200   \0  006   \0  003  003  364  325
0017720  001   \0  006   \0  364  265  001   \0  006   \0  004  003  364  265    @   \0
0017740  006   \0  014  003  300  025  377  377    w   \0  334  020  316  025   \0  002
0017760  337   \t  366    )    4  020  004   \0  021  002  364  325  004   \0  006   \0
0020000  364  013  004   \0  016  002  364  265  004   \0  006   \0  357  003   \0  235
0020020  007   \0  300    e  342    W    4  020  004   \0  362  001  364  325   \b   \0
0020040  006   \0   \f  035  004   \0  364  265  004   \0  006   \0  003  003  316  025
0020060  001   \0  002  001  316  025   \0  002    &  023   \0  235  007   \0    &  020
0020100  337   \t    J    /  226    %    4  020  002   \0  364   \n  002   \0  025  004
0020120  364    %  377  377  002   \0  013  002  364  325  020   \0  006   \0  364  265
0020140  200   \0  006   \0  007  003  364  305  001   \0  006   \0  003  001  364  325
0020160        \0  006   \0    4   \n  002   \0  265  001   \0  237   \0   \0  300    E
0020200   \0  377  214   \n  261  001  346  020    &  020  302  013  002  002  316  025
0020220  006   \0  024  365    &  370  367   \t    .  003  306    e   \f   \0  323  213
0020240  376  002  303   \n  207   \0  346  025  350    5  346  025  354    5  302  013
0020260  002  002  300  025  006   \0    &  020    7  020    >  025  024  365    &  370
0020300  367   \t    j  013  306    e  016   \0  367  013    ,  025  002  003  323  225
0020320    -   \0  302  035    &  025  002  006  323  225    0   \0  201  020  002  007
0020340  023  224    B    ~  301  035  022  025  002  003  323  225    .   \0  002  013
0020360  005  007  301   \n  003  005  323  225    0   \0  205    ~  301  013  002  007
0020400  023  224    B    ~  207   \0  346  025  350    5  346  025  354    5    &  020
0020420    7  020  346  024  302  013  002  002  316  025  006   \0  024  365    &  370
0020440  367   \t  344   \n  306    e  016   \0  367  013  314  024  002  003  323  225
0020460    -   \0  027  242    0   \0  002  002  267   \n  300  024  023  224  323  225
0020500    .   \0  301  035  264  024  301   \n  002  007  023  224    B    ~  323  225
0020520    e   \0  302  035  246  024  302   \n  201  020  004  004  323  225    -   \0
0020540  001  013  002  001  323  225    +   \0   \0   \n  027    r   \n   \0  300    e
```

| | 21 | | | | | | | | 22 | | | | | |
|---|---|---|---|---|---|---|---|---|---|---|---|---|---|---|
0020560 | 0 | \0 | 023 | 220 | 301 | e | 0 | \0 | 5 | 220 | 207 | \0 | w | \t | < | 017
0020600 | 306 | 345 | 214 | \0 | u | 035 | 004 | \0 | 366 | 377 | D | 035 | 006 | \0 | 203 | 021
0020620 | A | 035 | 366 | 377 | B | 224 | 005 | 003 | 227 | | % | \0 | 002 | 003 | 223 | 220
0020640 | 371 | 001 | u | 020 | 366 | 377 | 306 | | 013 | 003 | 200 | 021 | f | 035 | \b | \0
0020660 | & | \n | 346 | 020 | 016 | 340 | & | 020 | 367 | \t | H | 003 | 306 | e | \b | \0
0020700 | 302 | 013 | 002 | 002 | w | \0 | \0 | 017 | 203 | 021 | 5 | \n | 364 | 377 | 5 | \n
0020720 | 340 | 377 | 365 | 025 | | \0 | 356 | 377 | W | 257 | 366 | 377 | - | \0 | 004 | 002
0020740 | 265 | \n | 366 | 377 | 265 | \n | 364 | 377 | W | 257 | 366 | 377 | 0 | \0 | 003 | 002
0020760 | 365 | 025 | 0 | \0 | 356 | 377 | 367 | \b | 232 | 001 | u | 020 | 370 | 377 | 5 | \n
0021000 | 362 | 377 | 027 | | . | \0 | 004 | 002 | 367 | \b | 210 | 001 | u | 020 | 360 | 377
0021020 | 301 | 025 | 356 | 5 | B | 024 | 003 | 002 | 023 | 220 | w | \0 | F | 001 | 021 |
0021040 | 371 | 002 | J | \0 | @ | 035 | 360 | 377 | B | 035 | 362 | 377 | 367 | \t | V | 376
0021060 | _ | \0 | T | # | @ | 237 | 366 | 377 | 265 | \n | 366 | 377 | 027 | | o | \0
0021100 | 016 | 003 | 027 | | x | \0 | 021 | 003 | 027 | | | d | \0 | 031 | 003 | 027 |
0021120 | u | \0 | 037 | 003 | 365 | \n | 366 | 377 | 021 | 001 | \0 | \n | 001 | 001 | \0 | 025
0021140 | 302 | 025 | \b | \0 | 005 | 001 | \0 | \n | 001 | 001 | \0 | 025 | 302 | 025 | 020 | \0
0021160 | 001 | 025 | 023 | 001 | 001 | 025 | 300 | \r | 006 | 201 | \r | 001 | \0 | \n | \n | 001
0021200 | \0 | 025 | \b | 004 | 001 | 025 | \0 | 013 | 001 | 013 | 200 | 013 | 323 | 225 | - | \0
0021220 | 002 | 001 | \0 | 025 | 001 | 025 | 302 | 025 | \n | \0 | f | 021 | & | 021 | 004 | 020
0021240 | @ | 035 | 360 | 377 | E | 020 | 027 | w | \0 | \0 | 004 | 003 | 300 | 013 | 002 | 003
0021260 | 323 | 225 | 0 | \0 | 367 | \t | 006 | \0 | 204 | 025 | 205 | 025 | 5 | 001 | \0 | \n
0021300 | 001 | 021 | 003 | 003 | 002 | r | 004 | 020 | @ | 020 | A | 021 | 302 | \f | 002 | r
0021320 | 202 | \f | 300 | \f | 201 | | 002 | 006 | 201 | 340 | 200 | \n | f | 020 | 005 | 020
0021340 | 002 | 002 | 304 | 013 | 002 | 003 | 367 | \t | 324 | 377 | 200 | 025 | 300 | e | 0 | \0
0021360 | 027 | | 9 | \0 | 002 | 007 | 300 | e | ' | \0 | 023 | 220 | 207 | \0 | 365 | 025
0021400 | | \0 | 356 | 377 | \0 | 025 | 300 | E | \0 | 377 | , | 003 | 023 | 220 | * | 001
0021420 | 365 | 025 | | \0 | 356 | 377 | A | 035 | 360 | 377 | 002 | 023 | 203 | 020 | 004 | 002
0021440 | 302 | 025 | 2 | 6 | 203 | 020 | 214 | 020 | 322 | 213 | 002 | 003 | 203 | \n | D | ~
0021460 | 002 | 025 | 031 | 001 | @ | 035 | 360 | 377 | B | 035 | 362 | 377 | 367 | \t | f | 375
0021500 | 021 | 001 | @ | 035 | 360 | 377 | 200 | \n | 365 | 013 | 362 | 377 | 002 | 002 | 300 | 025
0021520 | 007 | \0 | 302 | 021 | 367 | \t | 256 | 375 | 005 | 001 | 004 | 025 | 5 | 025 | 366 | 377
0021540 | w | \0 | * | 376 | 202 | 021 | 203 | 340 | A | 035 | 370 | 377 | 301 | 340 | 001 | 004
0021560 | 001 | \n | 365 | 013 | 364 | 377 | 001 | 002 | 001 | 013 | f | 035 | 356 | 377 | f | 035
0021600 | \b | \0 | f | 020 | 346 | 020 | 246 | 020 | 367 | \t | x | 001 | 306 | e | \n | \0
0021620 | w | \0 | 372 | 375 | 5 | \n | 362 | 377 | 001 | \n | @ | 237 | 366 | 377 | 265 | \n
0021640 | 366 | 377 | 300 | 345 | 0 | \0 | 027 | | 372 | 377 | 002 | 002 | \0 | 025 | 003 | 001
0021660 | 027 | | \t | \0 | 006 | 202 | 265 | \n | 362 | 377 | W | p | \n | \0 | 001 | `
0021700 | 354 | 001 | 300 | e | 0 | \0 | 203 | \0 | w | \t | 360 | \f | 306 | 345 | 004 | \0
0021720 | N | 021 | 316 | @ | 370 | 377 | f | 021 | 316 | @ | 366 | 377 | f | 035 | \f | \0
0021740 | 5 | 365 | 004 | \0 | & | 370 | 377 | \t | 370 | + | 306 | @ | \f | \0 | 004 | 020
0021760 | C | 035 | 016 | \0 | 365 | 013 | 370 | 377 | 002 | 003 | 323 | 225 | - | \0 | B | 035
0022000 | \f | \0 | 302 | \n | 302 | 013 | 031 | 006 | 365 | 013 | 366 | 377 | 007 | 005 | @ | 035
0022020 | 366 | 377 | @ | 355 | \f | \0 | 300 | % | 004 | \0 | 007 | 005 | 365 | 013 | 366 | 377
0022040 | : | 004 | 365 | % | 375 | 377 | 366 | 377 | 6 | 007 | 365 | \n | 366 | 377 | 023 | 225
0022060 | 323 | 225 | `` | . | \0 | 302 | 025 | 001 | \0 | \n | 001 | \0 | 021 | 200 | ` | 310 | 245
0022100 | 0 | \0 | 342 | 002 | 365 | \n | \f | \0 | 334 | 001 | 023 | 225 | 202 | \n | B | -
0022120 | \f | \0 | 373 | 006 | 323 | 225 | @ | \0 | 365 | 013 | 366 | 377 | \b | 004 | @ | 035
0022140 | 366 | 377 | \0 | 013 | 5 | 020 | 366 | 377 | 323 | 225 | - | \0 | 002 | 001 | 323 | 225
0022160 | + | \0 | A | 035 | 366 | 377 | 300 | \r | 027 | r | \n | \0 | 300 | e | 0 | \0
0022200 | 023 | 220 | A | 035 | 366 | 377 | 300 | \r | 027 | r | \n | \0 | 301 | e | 0 | \0
0022220 | @ | 020 | 023 | 220 | - | 001 | 365 | 013 | 366 | 377 | \r | 006 | 314 | 245 | 0 | \0
0022240 | 007 | 003 | 323 | 225 | . | \0 | 004 | 001 | 265 | \n | 366 | 377 | 323 | 225 | 0 | \0
0022260 | 365 | 013 | 366 | 377 | 371 | 005 | 302 | 025 | 001 | \0 | 007 | 001 | 023 | 225 | B | -
0022300 | 366 | 377 | 002 | 002 | 323 | 225 | | . | \0 | 202 | \n | B | - | \f | \0 | 366 | 004
0022320 | u | - | 366 | 377 | \f | \0 | 003 | 006 | 013 | 001 | 323 | 225 | 0 | \0 | @ | 035
0022340 | \f | \0 | 265 | \n | \f | \0 | @ | -- | 366 | 377 | 367 | 006 | 323 | 225 | . | \0
0022360 | 363 | 245 | | . | \0 | 377 | 377 | 001 | 002 | 303 | \n | 013 | 212 | @ | 035 | 016 | \0
0022400 | w | \0 | 304 | 013 | w | \t | 264 | 013 | D | 035 | 004 | \0 | C | 035 | 006 | \0
0022420 | B | 035 | \n | \0 | 031 | 001 | 216 | 020 | \0 | 225 | & | 020 | 316 | E | \0 | 377
0022440 | 337 | \t | 264 | % | 326 | 013 | 303 | \n | 362 | \n | 002 | \0 | 005 | 005 | z | 235
0022460 | \f | \0 | \0 | \0 | 212 | \n | 006 | 001 | 216 | 020 | f | 035 | \f | \0 | 337 | \t
0022500 | 264 | % | 326 | 013 | 265 | \n | \b | \0 | 365 | 013 | \b | \0 | # | 004 | 314 | 245
0022520 | - | \0 | 352 | 002 | 365 | % | 0 | \0 | \f | \0 | 346 | 002 | 362 | \n | 002 | \0
0022540 | 332 | 005 | \0 | 225 | 300 | E | \0 | 377 | : | 220 | \0 | \0 | 212 | \n | 333 | 001

```
0022560   \0  225  300    E   \0  377    :  220   \0   \0  212  \n  013  001  362  \n
0022600  002   \0  366  004  216  020   \0  225    &  020  316    E   \0  377  337  \t
0022620  264    %  326  013  303  \n  363  004  020  001  362  \n  002   \0  005  005
0022640    z  235  \f   \0   \0   \0  212  \n  006  001  216  020    f  035  \f   \0
0022660  337  \t  264    %  326  013  365  \n  \b   \0  365  013  \b   \0  355  002
0022700    w   \0  004  013    w  \t  364  \n    D  035  006   \0  306  345  004   \0
0022720  364  265  200   \0  006   \0  006  003  364  325  002   \0  006   \0  364  305
0022740  020   \0  006   \0  364  265  004   \0  006   \0  025  003    u  235  004   \0
0022760  366  377  365  025  001   \0  370  377    N  035  370  377    f  021  316    e
0023000  366  377   \0  235  007   \0    &  020  337  \t    !    0  226    %  002  020
0023020    4  \n  002   \0    ;  001  003  035  004   \0    #  002  304    %    B    6
0023040  021  002  300  235    3  020  016  020  337  \t  306    -  300  013  004  003
0023060  364  325  004   \0  006   \0  326  001  364  025  316    5  004   \0  314  025
0023100  316    5  320  001  316  025   \0  002  337  \t  366    )  003  020  364  020
0023120  004   \0  356  003  364  325  \b   \0  006   \0  002  \n  265  020  370  377
0023140  017  001  002  023  302  340  265  020  370  377  \n  007  314  020  216  020
0023160  346  020   \0  235  007   \0    &  020  337  \t    !    0  226    %  002  020
0023200  364  025  377  001  002   \0    5  235  004   \0  314  020  265       370  377
0023220  007  003  364  325        \0  006   \0  300  025  377  377    w   \0    (  \n
0023240    @  035  004   \0  373  001    w  \t  022  \n    D  035  004   \0   \0  235
0023260  006   \0  300    E  371  377  300    %  002   \0  034  002  003  035  004   \0
0023300  031  003   \0  023  300  340  002  020  025  007  314  020  364  025   \0  002
0023320  002   \0  216  020  346  020   \0  235  007   \0    &  020  337  \t    !    0
0023340  226    %  200       007  003  364  325        \0  006   \0  300  025  377  377
0023360    w   \0  324  \t   \0  \n  374  001    w  \t  300  \t  304  025    :    6
0023400  005  001  016  021  337  \t  006    '  304    e  \b   \0  304    -  332  017
0023420  370  202    w   \0  262  \t    w  \t  242  \t    D  035  004   \0  303  025
0023440  377  377  364  265  203   \0  006   \0  037  003  364  265    @   \0  006   \0
0023460  033  002  016  021  337  \t  226    &  003  020   \0  235  007   \0  016  020
0023500  337  \t  302    .  300  013  002  004  303  025  377  377  364  265  \b   \0
0023520  006   \0  004  003  016  035  004   \0  337  \t    0    +  364  265  \f   \0
0023540  006   \0  002  003    4  \n  004   \0  364  305  377   \0  006   \0    4  \n
0023560  002   \0  300  020    w   \0    P  \t    f  021  205  021  367  \t    x  377
0023600    @  035  004   \0  001  211    w  \t    2  \t  306  345  004   \0    5  \n
0023620  366  377  365  013  004   \0  026  003  016  \n  337  \t  264    .    5  020
0023640  370  377  316  025  366    W  337  \t    .    .  300  013  \r  003    N  035
0023660  366  377  346  025  016   \0  337  \t  266    /  326  013    N  035  370  377
0023700  337  \t  264    .    w   \0   \0  \t  365  013  370  377  026  003    D  035
0023720  004   \0  007  004  001  021  001  013  300  \r  027    r    <   \0  004  020
0023740  204  \n    5    !  370  377  003  206    5  341  370  377  006  001    u  035
0023760  370  377  004   \0  365  025  001   \0  370  377  316  025  \n    (  346  025
0024000  016   \0  337  \t  266    /  326  013    5  020  366  377    N  035  004   \0
0024020  337  \t  264    .  367  \t  024  007  375  001    w  \t  236  \b  316  025
0024040  001   \0  346  025  366    W  337  \t    <    .  326  013    w   \0  230  \b
0024060    w  \t  210  \b    D  035  004   \0  306  345    *   \0  027  365  200   \
0024100    5  370  332  377  365  025  001   \0  324  377  003  225  303    %   \0
0024120  374  003  303    %    -   \0  004  002  365  025  377  377  324  377  004  001
0024140  303    %    +   \0  001  003  304  \n    5  \n  326  377    5  361  362  377
0024160    5  \n  330  377  026  001    5  365  362  377    5  367  332  377   \0  360
0024200  \f  007  027  365         B    5  362  362  377  301  020  301    e  320  377
0024220    A  374  001  364    5  370  362  377  002  001  265  \n  326  377  265  \n
0024240  330  377  003  225  363  265  004   \0  355    6  345  002  303    %    .   \0
0024260  026  003  032  001    5  365  362  377    5  367  332  377   \0  360  \r  007
0024300  027  365         B    5  362  362  377  301  020  301    e  320  377    A  376
0024320  001  364    5  370  362  377  365  \n  326  377  265  \n  330  377  003  225
0024340  363  265  004   \0  355    6  346  002  365  025  001   \0  322  377  002  \n
0024360  303    %    E   \0  003  003  303    %    e   \0    $  002  003  225  303    %
0024400    +   \0  020  003  303    %    -   \0  004  002  365  025  377  377  322  377
0024420  \t  001  304  \n  007  001  201  020    W    p  \n   \0    B  020  302    `
0024440  302    e  320  377  003  225  363  265  004   \0  355    6  364  002  365  013
0024460  322  377  003  004  200  020   \0  013  002  020    @  035  326  377  200    `
0024500    5  020  326  377  365  025  001   \0  322  377  365  013  326  377  \b  004
0024520  365  025  377  377  322  377    @  035  326  377   \0  013    5  020  326  377
0024540    A  035  326  377    u    p  322  377    A    m  330  377  301    %  331  377
```

```
0024560  004 007    5 361 362 377    5  \n 326 377 027 365 200    @    5 370
0024600  352 377 027 365 240    A    5 370 342 377    u 035 326 377 320 377
0024620  005 001    5 365 342 377   \0 362    5 370 342 377 365    5 001  \0
0024640  326 377 006 003    5 365 352 377    5 362 342 377    5 370 352 377
0024660  265  \f 326 377 365 013 326 377 354 002 365 013 322 377 005 004
0024700    5 365 362 377    5 371 352 377 004 001    5 365 362 377    5 362
0024720  352 377    5 370 362 377    A 035 322 377    u    p 320 377    N 020
0024740    5 365 362 377    & 370 337  \t 356    - 306    e  \b  \0    5 370
0024760  362 377 365 013 324 377 003 004 300 361    5 370 362 377    5 365
0025000  362 377    w  \0 302 006    w  \t 262 006 367 013 376    - 022 002
0025020  300 025 376    W 300    U 001  \0    7 020 360    - 300 025 374    W
0025040  300    U 001  \0    7 020 346    - 367 025 376    W 344    - 367 025
0025060  374    W 334    -    A 035 004  \0 301    e 003  \0  \0  \n 027    v
0025100  377 377    B 020 304 035 310    -    7  \n 312    - 314    5 001  \0
0025120  002 003 017 001 314 022 003 023 313    5 001  \0 373 003 200 020
0025140  300  \f  \0    a 300        005 207 200 020 300  \f  \0    a  \0    !
0025160    R 203 003 021 004 023 304    E 001  \0 304        347 207 303    -
0025200  220    - 003 002 304    % 374    W 003 003  \0  \n    w  \0    8 006
0025220  267  \n 202    - 367    % 001  \0    !    - 330 004 201 020 301    e
0025240   \0 002 300  \r 027    r  \0 002 027    t  \t  \0    7 020    f    -
0025260  016  \n 337  \t    1    / 003 020 300 035    Z    - 300  \f 300    `
0025300  300    e 200  \0 300        341 202 300 035    J    - 300  \f 016 020
0025320  337  \t    1    / 003 020 303    % 377 377 327 003 377 020    2    -
0025340  300 035    .    - 300    e 002  \0 300        005 003 300 020 300    U
0025360  001  \0    ? 020 034    - 300 035 034    - 300  \f 300    ` 300    e
0025400  376 377 013 020    7 020  \n    - 300 025 374    W 300    U 001  \0
0025420    7 020 376    , 231 001 200 020 300  \f  \0    a    7 020 360    ,
0025440  003        005 206 367 037 350    , 352    ,    ? 023 342    , 300 035
0025460  336    , 300    U 001  \0  \f 020  \0 021 300    e 002  \0 246 001
0025500    w  \t    x 005    D 035 004  \0 003 021 303 345 002  \0 367 020
0025520  276    , 300 022 300    E 001  \0 013 020    w  \0    j 005    w  \t
0025540    Z 005    D 035 004  \0 306 345 006  \0 364    5 001  \0 376 377
0025560  003 003 016 021 337  \t    0    + 001 035 376 377 001 341  \0    @
0025600  200 013 027    r 002  \0    5 020 364 377    N 035 006  \0 337  \t
0025620  366    ) 003 020 002 003 003    ! 003 002 300 020    w  \0    ( 005
0025640    5 021 370 377 365 020 366 377    A 035 006  \0 201  \n  \0  \n
0025660  027    v 377 377    B 020    B    - 364 377  \f 203 265 020 364 377
0025700   \t 001    ) 037 370 377 366 377 365    e 002  \0 366 377 365    e
0025720  002  \0 370 377    @ 035 364 377 365  \n 364 377 300 013 361 002
0025740  003    ! 333 203 200 020 300  \f 300    `  \0    ! 326 202 201 020
0025760  301  \f 301    ` 001 341  \0    @ 200 013 027    r 002  \0 300  \f
0026000  300    ` 310 035 016    , 311 001    w  \t 260 004 316 025 001  \0
0026020    f 035 020  \0    f 035 016  \0    f 035  \f  \0    5 365 004  \0
0026040    & 370 337  \t    B    , 306    e 016  \0    w  \0 232 004    w  \t
0026060  212 004 016  \n    f 035 020  \0    f 035 016  \0    f 035  \f  \0
0026100    5 365 004  \0    & 370 337  \t    B    , 306    e 016  \0    w  \0
0026120    v 004    w  \t    f 004 306 345 020  \0 365 013  \f  \0 002 004
0026140    5  \n  \f  \0 365    %    0  \0  \f  \0 003 006 365 025    N  \0
0026160   \f  \0 004  \n    =  \n 020  \0 303 025  \b    X  \0 361    5 367
0026200  004  \0  \0 360  \b 004 375 025 001  \0 020  \0    5 365 004  \0
0026220  300 361    5 370 004  \0    N 021 316    e 362 377    5 365 004  \0
0026240    & 370 337  \t 032    . 306    e  \b  \0    5 370 004  \0 302 025
0026260    X    X  \0 361    5 367 362 377  \0 360 035 002  \0 361    5 367
0026300  004  \0  \0 360    ` 006    0 001    N 021 316    e 362 377    5 365
0026320  362 377 027 371        B    & 370 337  \t 032    . 306    e  \b  \0
0026340    5 370 352 377    7 364 004  \n 027 362        B  \0 373 300    e
0026360    0  \0    " 220 204  \n  \0 361    5 367 362 377  \0 360 344 002
0026400  302    %    X    X 021 203 223 224 373 001    5 365 352 377    5 370
0026420  004  \0 304  \n    5 365 004  \0 027 362        B    5 370 352 377
0026440  027 367 200    @  \0 360 361 006    B 035  \f  \0 302    e  \b    X
0026460  365 013 022  \0 001 002 002    a    = 021 016  \0 302    %  \b    X
0026500  006 203    7 212 322    * 300 025  \b    X    w  \0    z 003 203
0026520  034 207 303    %    X    X 031 203    5 365 004  \0 027 362        B
0026540    5 370 004  \0    N 021 316    e 352 377    5 365 004  \0    & 370
```

| | | | | | | | | | | | | | |
|---|---|---|---|---|---|---|---|---|---|---|---|---|---|
|0026560|337|\t|032|.|306|e|\b|\0|5|370|004|\0|5|365|352|377|
|0026600|\0|373|300|e|0|\0|023|220|342|001|302|%|X|X|003|202|
|0026620|7|212|323|*|330|001|203|020|300|025|005|\0|201|222|001|`|
|0026640|J|220|024|001|242|212|022|001|312|225|0|\0|302|%|\b|X|
|0026660|371|207|312|225|1|\0|275|\n|016|\0|365|013|022|\0|006|002|
|0026700|303|%|\b|X|002|206|313|225|0|\0|203|\n|312|245|9|\0|
|0026720|353|005|013|212|270|001|w|\t|342|002|306|345|006|\0|N|021|
|0026740|316|e|364|377|f|035|004|\0|337|\t|202|.|326|013|300|013|
|0026760|003|004|\0|\n|w|\0|320|002|300|025|001|\0|373|001|w|\t|
|0027000|272|002|5|365|004|\0|\0|372|@|m|\f|\0|\0|375|\0|360|
|0027020|\n|204|003|201|7|365|334|\b|003|001|7|365|326|\b|300|361|
|0027040|367|025|"|\0|270|)|w|\0|236|002|w|\t|216|002|5|365|
|0027060|004|\0|027|363|200|@|)|370|\f|\0|w|\0|212|002|200|035|
|0027100|002|\0|P|021|220|021|210|023|\0|\n|207|\0|w|\t|1|002|
|0027120|A|035|004|\0|@|035|006|\0|002|002|300|025|001|\0|I|*|
|0027140|006|003|E|023|374|002|E|024|F|024|N|022|207|\0|u|034|
|0027160|004|\0|002|\0|w|\0|P|002|w|\t|@|002|N|035|006|\0|
|0027200|346|025|\t|t|f|035|004|\0|337|\t|330|.|226|%|w|\0|
|0027220|6|002|w|\t|&|002|N|035|006|\0|346|025|\b|t|f|035|
|0027240|004|\0|337|\t|330|.|226|%|w|\0|034|002|w|\t|\f|002|
|0027260|D|035|004|\0|003|\n|001|001|203|\n|324|213|375|002|300|020|
|0027300|w|\0|004|002|f|021|205|021|@|035|004|\0|033|211|205|025|
|0027320|207|\0|f|021|205|021|@|035|004|\0|006|211|002|206|w|\0|
|0027340|314|001|\0|\n|205|025|207|\0|f|021|205|021|w|035|004|\0|
|0027360|216|\b|w|035|006|\0|212|\b|w|035|\b|\0|206|\b|\0|211|
|0027400|n|7|002|206|w|\0|246|001|205|025|\0|\n|207|\0|f|021|
|0027420|205|021|w|035|004|\0|p|\b|w|035|006|\0|1|\b|205|211|
|0027440|v|7|002|206|w|\0|206|001|205|025|207|\0|f|021|205|021|
|0027460|035|211|205|025|207|\0|f|021|205|021|w|035|004|\0|N|\b|
|0027500|w|035|006|\0|J|\b|w|035|\b|\0|F|\b|\0|211|!|7|
|0027520|002|206|w|\0|X|001|205|025|207|\0|f|021|205|021|@|035|
|0027540|004|\0|w|035|006|\0|.|\b|w|035|\b|\0|*|\b|\0|211|
|0027560|204|7|002|206|w|\0|6|001|205|025|207|\0|f|021|205|021|
|0027600|w|035|004|\0|026|\b|\b|003|367|m|022|\b|016|\b|\0|211|
|0027620|212|7|002|206|w|\0|026|001|300|035|002|\b|w|m|004|\0|
|0027640|374|007|205|025|207|\0|f|021|205|021|w|035|004|\0|354|007|
|0027660|\0|211|212|7|002|206|w|\0|364|\0|w|035|004|\0|336|007|
|0027700|\0|\n|205|025|207|\0|f|021|205|021|A|035|004|\0|w| |
|0027720|024|\0|036|206|@|035|006|\0|w|020|306|007|301|\f|f|034|
|0027740|X|X|1|020|X|X|7|020|272|007|\b|003|300|5|001|\0|
|0027760|005|002|301|\f|301|e|\b|0|w|020|250|007|\0|211|220|7|
|0030000|\t|207|300|5|001|\0|001|003|016|020|200|025|205|025|207|\0|
|0030020|300|025|026|\0|w|\0|226|\0|7|\b|L|\0|7|\b|H|\0|
|0030040|7|\b|D|\0|7|\b|@|\0|7|\b|<|\0|7|\b|8|\0|
|0030060|7|\b|4|\0|7|\b|0|\0|7|\b|,|\0|7|\b|(|\0|
|0030100|7|\b|$|\0|7|\b| |\0|7|\b|034|\0|7|\b|030|\0|
|0030120|7|\b|024|\0|7|\b|020|\0|7|\b|\f|\0|7|\b|\b|\0|
|0030140|7|\b|004|\0|7|\b|\0|\0|f|020|246|020|346|020|&|021|
|0030160|300|345|\f|0|200|\f|&|020|216|\f|370|\t|X|X|326|013|
|0030200|204|025|203|025|202|025|201|025|200|025|006|\0|f|021|205|021|
|0030220|@|035|004|\0|w|035|006|\0|014|007|w|035|\b|\0|\n|007|
|0030240|\0|211|226|7|002|206|w|\0|004|\0|205|025|207|\0|7|020|
|0030260|,|'|300|025|377|377|.F|021|205|025|207|\0|@|021|205|021|
|0030300|&|021|346|020|246|020|310|\t|B|021|204|030|203|030|202|030|
|0030320|F|021|205|025|207|\0|\0|350|B|\0|\0|354|B|\0|\0|
|0030340|360|B|\0|\0|364|B|\0|\0|370|B|\0|\0|374|B|\0|\0|
|0030360|\0|C|\0|\0|003|C|\0|\0|006|C|\0|\t|C|\0|\0|
|0030400|\f|C|\0|\0|017|C|\0|\0|022|C|\0|\0|025|C|\0|\0|
|0030420|032|C|\0|\0|036|C|\0|\0|"|C|\0|\0|&|C|\0|\0|
|0030440|*|C|\0|\0|001|\0|\n|033|Q|R| |!|"|#|$|%|
|0030460|d|\0|232|005|t|005|t|005|224|005|t|005|240|005|\n|e|
|0030500|t|:| |e|r|r|o|r| |i|n| |i|n|i|t|
|0030520|i|n|g| |p|h|y|s|i|n| |i|n|i|t|
|0030540|e|v|/|t|t|y|\0|F|I|G|U|R|E| |5|C|

```
0030560  R   E   E   N   \0  \0  p   r   e   p   a   r   i   n   g
0030600  i   m   a   g   e   .   .   \0  \0  \0  T   h   a   n   k
0030620      Y   o   u   !   \0  \0  t   y   p   e       f       a.
0030640      f   l   i   p           i   m   a   g   e   ,       f
0030660  o   r       a   n   o   t   h   e   r   .       d   f   o
0030700  r       d   o   n   e   \0  p   l   e   a   s   e       n
0030720  s   w   e   r       f       a       o   r       d   \0  \0  \0
0030740  \0  P   l   e   a   s   e       a   i   m       c   a   m
0030760  r   a       a   t       c   u   s   t   o   m   e   r   ,
0031000  p   o   s   i   t   i   o   n   i   n   g   \0  c   u   s   t
0031020  o   m   e   r   '   s       i   m   a   g   e       i   n
0031040  v   i   e   w   e   r       o   u   t   l   i   n   e   .   \0
0031060      \0  P   r   e   s   s       R   E   T   U   R   N       t
0031100  o       c   a   p   t   u   r   e       c   u   s   t   o   m
0031120  e   r   '   s       i   m   a   g   e   .   .   .   \0
0031140
*
0031200          G   O   T       I   T   !   \0  s   t   o   r   e   :
0031220      e   r   r   o   r       i   n       h       e   r   r   o   r
0031240  %   d   \n  \0  s   t   o   r   e   :       e   r   r       c   o
0031260      i   n       v       p   o   s       %   d   \n  \0  c   a   l   i   n
0031300  p   y   :       e   r   r   o   r           c   a   l   l   i
0031320  g       r   r   a   s   t   :       %   d   \n  \0  c   o   p
0031340  y   :       e   r   r   o   r           c   a   l   l   i   n
0031360      w   r   a   s   t   :       %   d   \n  \0  \0  \0  \0
0031400              T   y   p   e       s   e   x       o   f       c
0031420  u   s   t   o   m   e   r       (   m       o   r       f   )
0031440  :       \0  %   l   s   \0  \0  \0      T   y   p   e       j   a   c   k   e   t       s
0031460              T   y   p   e       j   a   c   k   e   t       s
0031500  i   z   e   :   .   \0  %   d   \0  \0
0031520              T   y   p   e       d   r   e   s   s       s
0031540  i   z   e   :       \0  %   d   %   d   \0  \0  \0  .
0031560                      T   y   p   e           n   e   w
0031600      j   a   c   k   e   t       s   i   z   e   :       \0  %
0031620  d   \0  \0                                  T   y   p
0031640  e       n   e   w       d   r   e   s   s       s   i   z   e
0031660  :       \0  %   d   \0  %   d   \0  \0  l   i   n   e   %
0031700  d   \n  \0  \0  320 \r  032 016 D   016 n   016 226 016 256 016
0031720  306 016 4   017 z   017 236 017 244 017 356 016 %   s   \0  %
0031740  s   \0  s   e   x   :                           s   i   z   e   :
0031760                          n   e   w       s   i   z   e   :   \0
0032000  %   s   \0  %   s   \0  %   s   \0  %   s   \0  %   s   \0  %
0032020  s   \0  033 \0  %   c   Y   %   c       %   c   \0  %   c   t   \0
0032040  %   c   v   \0  020 300 \0  300     300     300 030 300 032 300 \b  300
0032060  \n  300 (   300 *   300 034 300 036 300 \f  300 016 300 ,   300
0032100  .   300 024 300 026 300 004 300 006 300 $   300 &   300 330 021
0032120  &   022 0   022 J   022 d   022 x   022 236 022 306 022 334 022
0032140  354 022 374 022 262 021 362 021 h   021 <   023 210 023 224 021
0032160  244 021 &   022 f   b   f   u   n   c   :       e   r   r   o
0032200  r       m   a   p   p   i   n   g       t   o       p   h   y
0032220  s   i   c   a   l       i   /   o   \n  \0  f   b   f   u   n
0032240  c   :       I   n   v   a   l   i   d       c   o   m   m   a
0032260  n   d   :       %   d   \n  \0  020 300 \0  300     300 l   r
0032300  a   s   t   :       r   e   a   d       e   r   r   o   r   ,
0032320      r   e   t   u   r   n   e   d       %   d   \n  \0  l   r
0032340  a   s   t   '   s   :       r   e   a   d       e   r   r   o
0032360  r   ,       r   e   t   u   r   n   e   d       %   d   \n  \0
0032400  020 300 \0  300     300     r   e   c   t   :       f   b   f   u
0032420  n   c           e   r   r   o   r       s   a   v   i   n   g
0032440  r   e   g   i   s   t   e   r   s   \n  \0  r   e   c   t   :
0032460      f   b   f   u   n   c           e   r   r   o   r       s   e
0032500  t   t   i   n   g       w   r   i   t   e       i   n   c   \n
0032520  \0  \0  \0  \0  \0  \0  \0  \0  \0  \0  001 001 \0  \0  \0
0032540  \0  \0  \0  \0  \0  \0  \0  \0  \0  \0  \0  \0  \0  \0
```

Having described my invention, what I now claim is:

1. A system for a weight and/or measurement reduction preview system which comprises:
   means to record as a first image a customers body;
   means to store the first image in horizontal raster lines;
   means to enter information corresponding to the actual proportions of the customers body;
   means to enter the information corresponding to the desired proportions of the customers body;
   means to reproportion the pixels along the horizontal axis of each raster line by applying a stretch or shrink factor, said factor applied to the difference between the actual dimensions and the desired dimensions to form a reproportioned raster line;
   means to create a reproportioned figure of the customer based on said reproportioned raster line;
   means to produce a new image based on the reproportioned original image; and
   means to display said reproportioned image.

2. The system of claim 1 wherein the means to reproportion includes means to repartition the rasters using fractions of pixels according to the stretch and/or shrink factor.

3. The system of claim 1 wherein the means to reproportion includes means to provide low pass filtering and sampling to provide the new pixel spacing.

4. The system of claim 1 wherein the means to record includes a video camera and wherein the means to store includes means to store said image on a raster by raster basis.

5. The system of claim 1 wherein the means to record includes a video camera in combination with a frame grabber;
   the means to display includes a video screen; and
   the means to display the reproportioned image includes means to display said reproportioned image and the first image adjacent one another.

6. A method for displaying the effect a weight and/or measurement reduction system would have on a customers body which includes:
   recording as a first image a customer's body;
   storing the first image in horizontal raster lines;
   entering the information corresponding to the actual proportions of a customer's body;
   entering information corresponding to the desired proportions of the customer's body;
   creating a reproportioned figure of a customer by reproportioning the pixels along the horizontal axis by applying a stretch or shrink factor to each raster, said factor applied to the difference between the actual dimensions and the desired dimensions to form a reproportioned raster line;
   creating a reproportioned figure of the customer based on said reproportioned raster lines;
   producing a new image based on the reproportioned original image; and
   displaying the reproportioned image.

7. The method of claim 6 which includes
   digitizing the first image; and
   storing the image in the memory on a raster by raster basis.

8. The method of claim 6 wherein the step of creating the reproportioned figure includes
   stretching and/or shrinking horizontally the stored image by raster.

9. The method of claim 6 which includes displaying the first image adjacent to the reproportioned image.

10. The method of claim 6 which includes reproportioning the horizontal raster lines by repartitioning the rasters using fractions of pixels according to the stretch or shrink factor.

11. The method of claim 6 which includes:
providing new pixel spacing by filtering and sampling.

12. The method of claim 6 which includes:
recording the first image with a video camera.

13. The method of claim 12 which includes:
storing the recorded image on a raster by raster basis.

14. The method of claim 6 which includes:
displaying the reproportioned image on a video screen.

15. The method of claim 14 which includes:
displaying the reproportioned image adjacent to the first image.

* * * * *